(12) United States Patent
Starnes

(10) Patent No.: US 7,798,067 B2
(45) Date of Patent: Sep. 21, 2010

(54) THIN TURNTABLE

(76) Inventor: Mark Jason Starnes, 602 Southleigh Road, Emsworth, Hampshire (GB) PO10 7TA ( * ) Notice: Subject to any disclaimer, the term of this patent is extended or adjusted under 35 U.S.C. 154(b) by 217 days.

(21) Appl. No.: 11/884,762

(22) PCT Filed: Jun. 22, 2005

(86) PCT No.: PCT/GB2005/002490

§ 371 (c)(1),
(2), (4) Date: Aug. 21, 2007

(87) PCT Pub. No.: WO2006/090097

PCT Pub. Date: Aug. 31, 2006

(65) Prior Publication Data

US 2008/0173207 A1 Jul. 24, 2008

(30) Foreign Application Priority Data

Feb. 25, 2005 (GB) .................................. 0503867.4

(51) Int. Cl.
*B60S 13/02* (2006.01)
(52) U.S. Cl. .............................. 104/44; 104/35; 104/45
(58) Field of Classification Search .................. 104/44, 104/35, 45, 46; 246/465
See application file for complete search history.

(56) References Cited

U.S. PATENT DOCUMENTS 1,234,033 A * 7/1917 Isemen ......................... 104/44
3,610,525 A * 10/1971 Townsend et al. .......... 238/10 R
4,298,305 A 11/1981 Neth et al.
4,668,272 A * 5/1987 Newcamp et al. .............. 65/335
5,626,079 A * 5/1997 Summers ...................... 104/44
5,957,055 A * 9/1999 Bauer et al. .................... 104/35
6,817,300 B2 * 11/2004 Schwenker .................... 104/44

FOREIGN PATENT DOCUMENTS

| DE | 43 35 679 A1 | | 4/1995 |
|----|----|----|----|
| GB | 2 235 426 A | | 3/1991 |
| GB | 2 346 126 A | | 8/2000 |
| GB | 2410479 A | * | 8/2005 |
| WO | 87/01079 A | | 2/1987 |
| WO | 88/00897 A | | 2/1988 |
| WO | WO 8800897 A1 | * | 2/1988 |
| WO | 03/006282 A | | 1/2003 |

* cited by examiner

*Primary Examiner*—S. Joseph Morano
*Assistant Examiner*—Zachary Kuhfuss
(74) *Attorney, Agent, or Firm*—Young & Thompson

(57) ABSTRACT

A turntable for a heavy object such as a car which includes a ground-engaging member and a load-supporting platform each having load surfaces facing each other, the load-supporting platform being supported off the ground-engaging member by an intermediate load transfer unit comprising a plurality of rotatable bearing elements distributed across an extended region of the load surfaces to allow rotation of the load-supporting platform with respect to the ground-engaging member.

20 Claims, 18 Drawing Sheets

Sectional view on XX

Fig 11
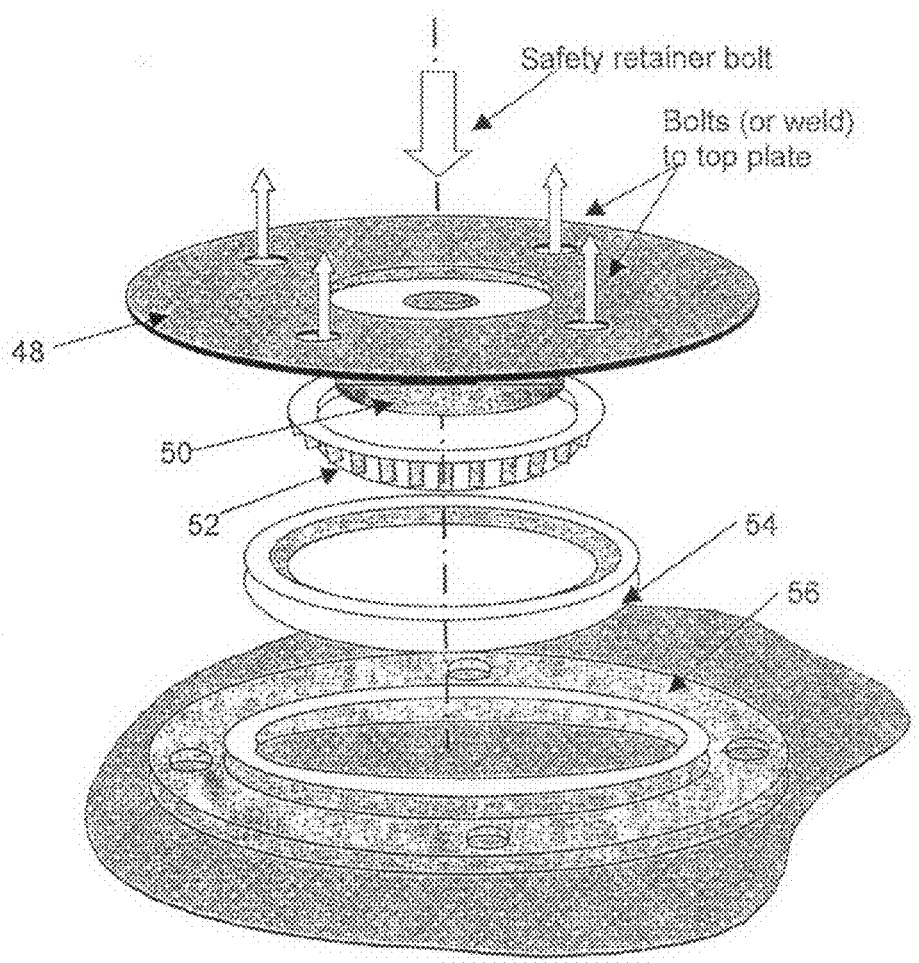
Fig 12
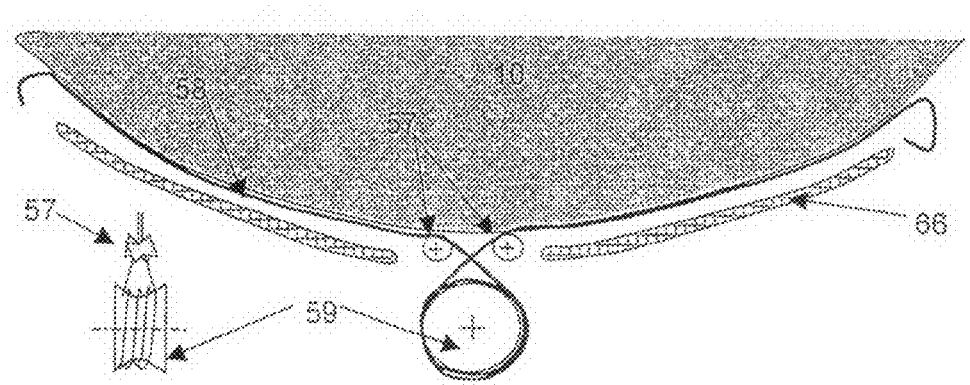
Fig 13

Fig 37
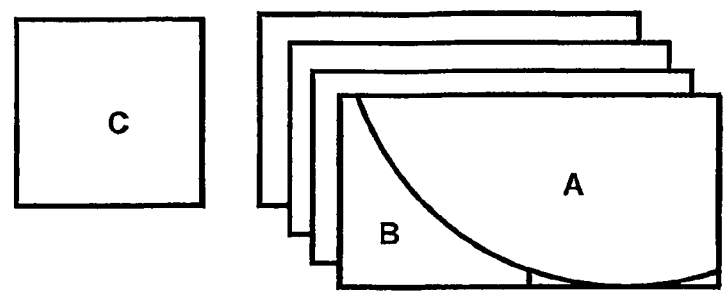
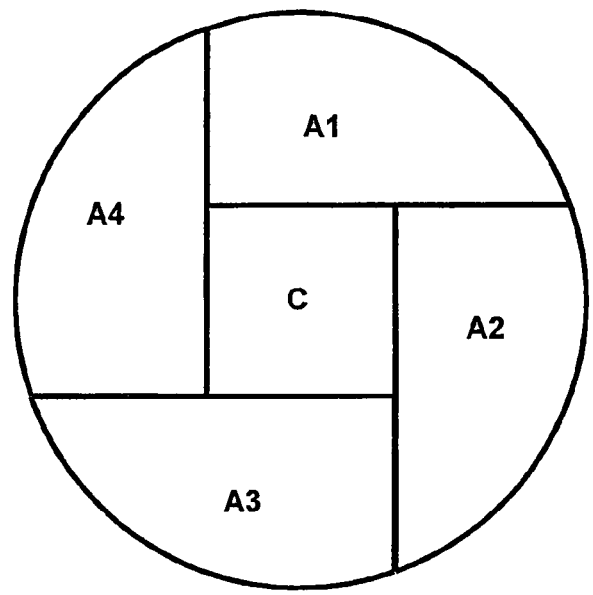
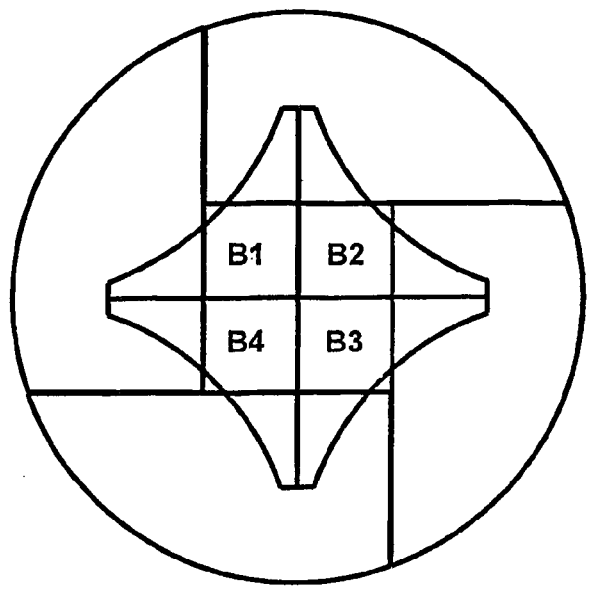

Exploded view

View on XX

Fig 44
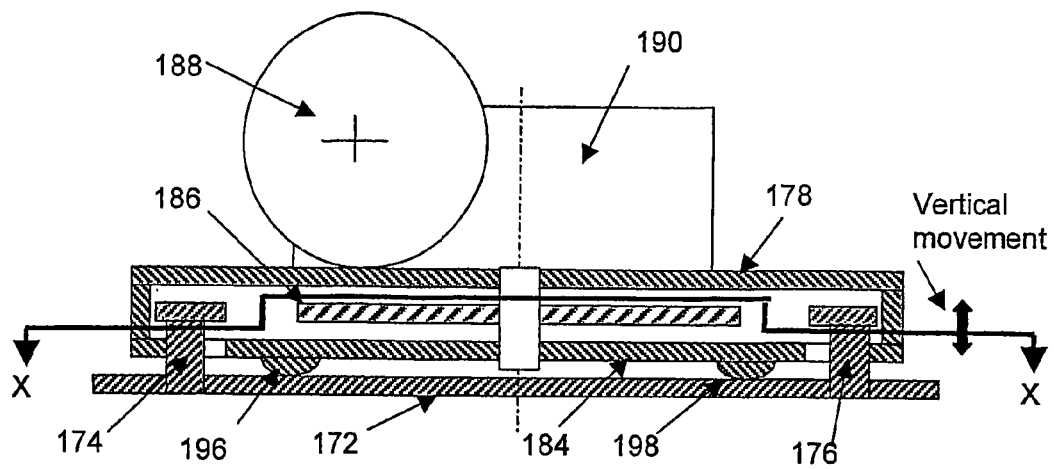
Fig. 45
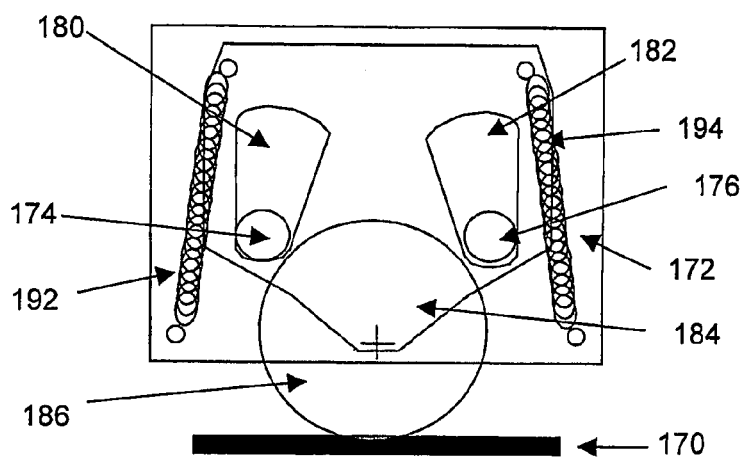
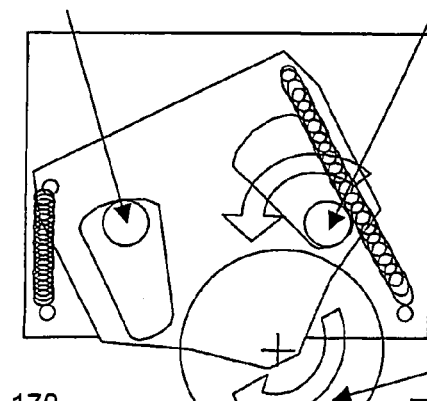
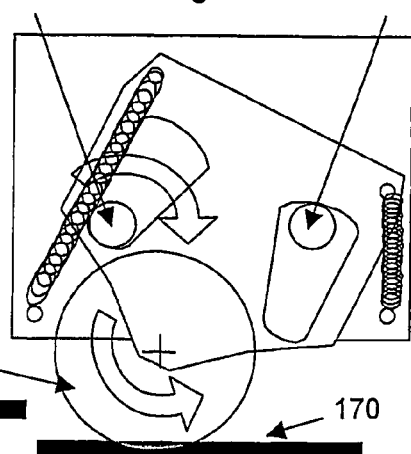

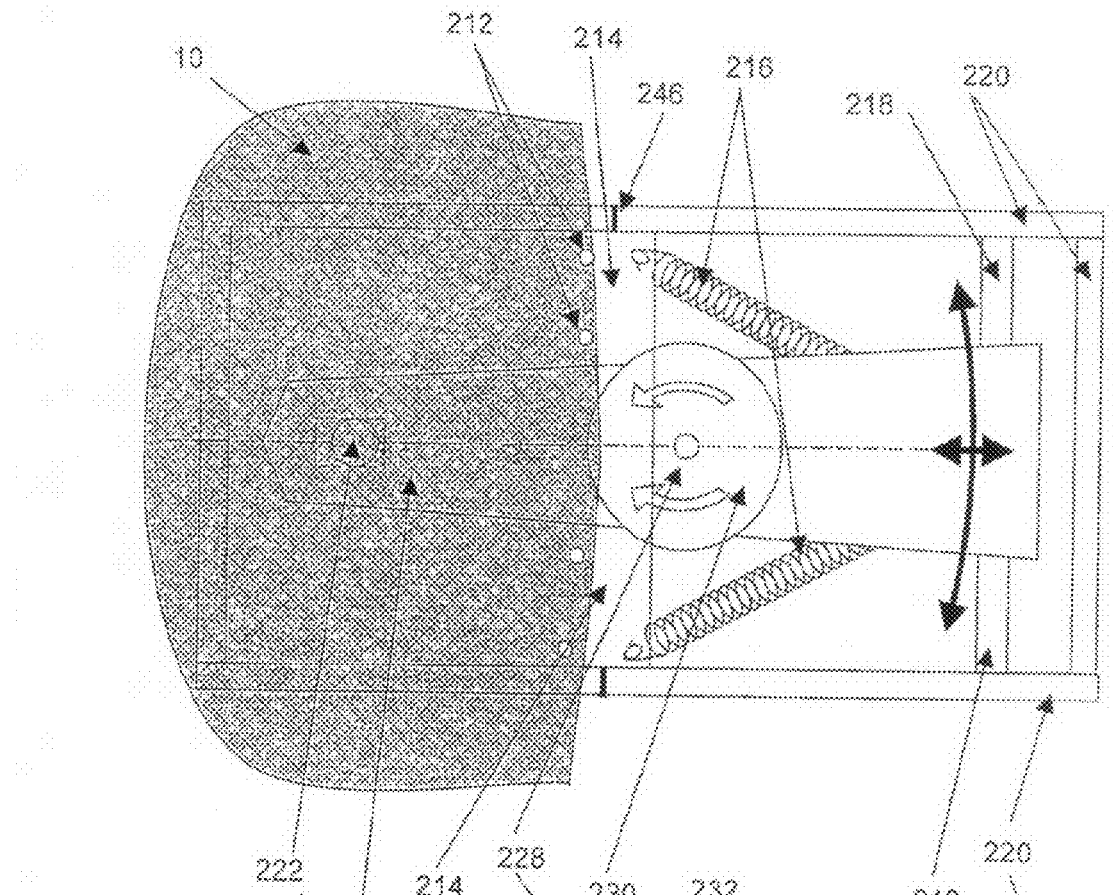
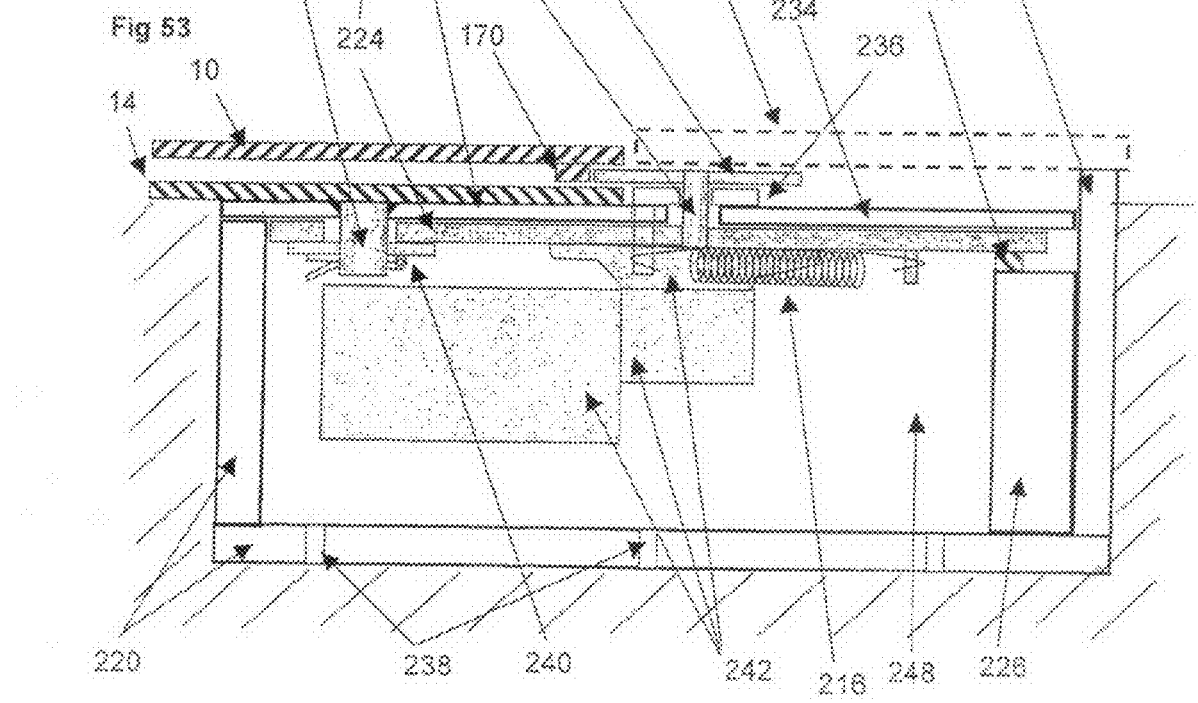

THIN TURNTABLE

FIELD OF THE INVENTION

This invention relates to a turntable for rotating a large and/or heavy object such as a car. The invention may also be used to rotate other heavy objects such as, for example, a summerhouse (to align sun or shade) or a shop display.

BACKGROUND OF THE INVENTION

It is known to provide vehicle turntables but these have generally tended to be large and cumbersome and to require sinking into the ground or the provision of a rigid foundation or substantial framework such that the resulting height is aesthetically undesirable.

There is a need for a vehicle turntable which is sufficiently thin to be capable of surface mounting without requiring the digging of foundations or the like and to be aesthetically acceptable in its above ground height. There is also a need for a turntable which can be used at sites where there is no pre-prepared flat level foundation of concrete, asphalt or the like, so that the turntable can be installed for example on an earth base, with minimal prior preparation.

I have designed a turntable, which in part, trades the normal framework of a conventional design for a new distributed support system, and thus attains a very thin turntable.

SUMMARY OF THE INVENTION

Accordingly, in one aspect, this invention provides a turntable for a heavy object such as a car, said turntable including a ground-engaging member and a load-supporting platform each having load surfaces facing each other, the load-supporting platform being supported off the ground-engaging member by an intermediate load transfer means comprising a plurality of rotatable bearing elements distributed across an extended region of said load surfaces to allow rotation of said load-supporting platform with respect to said ground-engaging member, and wherein at least one of said ground-engaging member and said load-supporting member is capable of resilient flexing movement in use.

In preferred embodiments, this enables design of a unit with a maximum height of 50 mm, measured between the general top surface of the load-supporting platform and the general lower surface of the ground-engaging member and arrangements of even less height have been achieved of about 30 mm. Preferably both said ground-engaging member and said load-supporting platform are adapted to flex to conform to the profile of the local ground surface in the illustrated embodiments. On uneven ground the flexible nature of the whole turntable sandwich (ground-engaging member, race and load-supporting platform) means that the turntable follows the ground profile as modified by the limited rigidity of the elements, with each layer smoothing out the finer levels of undulations/irregularities in the surface finish. The flexing of the platform and/or the member provides numerous advantages. The flexing provides local proportional support; it does not require a rigid structural frame of any sort; the platform and member can provide uniform or smoothly varying flexure characteristics across their extents. The turntable surface therefore provides flexibility over a single extended region of the turntable surface as a whole. The flexing of the surface does not rely on hinging or pivoting movement of sub-elements or the like.

Preferably said bearing elements are provided across substantially the whole of said load surfaces.

Preferably said rotatable bearing elements are mounted in a race means, wherein in use said race means rotates at about one half the speed of rotation of the load-supporting platform relative to the ground-engaging member.

By this arrangement, the vertical load from the vehicle—ordinarily applied through the tyres—is distributed by the load-supporting platform to be carried by the rotatable bearing elements to the lower ground-engaging member.

Advantageously, the ground-engaging member and the load-supporting platform have extensive mutually opposed parallel surfaces over at least a substantial part and preferably substantially the whole of their surfaces. These opposed generally flat parallel surfaces may engage to either side of the central race, providing extensive contact surfaces over substantially the whole diameter apart from at a small portion at the centre. I do not however exclude arrangements in which the opposed surface carry an array of contact rails or roller elements disposed across substantially the whole of the diameter.

Whilst they may take any suitable form, the ground-engaging member and the load-supporting platform are preferably each of disc or annular form, and each of a similar external diameter. The ground-engaging member and the load-supporting platform are preferably constructed from one or more relatively thin sheet members.

Preferably, the load-supporting platform and/or the ground-engaging member are capable of resilient flexing movement in use. This assists distribution of the vertical load between several rotatable bearing elements. Thus, in the preferred embodiments the load-supporting platform and the ground-engaging member are each either single sheet components, or sub-components non-hingedly attached, so that each flexing as one.

In one embodiment, the load surfaces on each of said ground-engaging member and said load-supporting platform each comprise a circular rail or track concentric with the intended axis of rotation of said load carrying platform, with at least some of the rails on the ground-engaging member being aligned with corresponding rails on the load-supporting platform. In this embodiment the rails on the ground-engaging member and the load-carrying platform may be arranged in pairs of vertically aligned rails with the intermediate load transfer means comprising one or more respective circular arrays of radially disposed rotatable roller means, within each array co-operating with respective pairs of rails on said load carrying platform and said ground-engaging member.

The race means of the intermediate load transfer means may take various forms; for example an apertured plate or an open frame structure. Where the race means comprises an apertured plate, the apertures may be arranged in one or more circular arrays, each aperture having associated therewith at least one rotatable roller means. The roller means may be supported by a mounting comprising spaced, generally parallel, boxed sections rotatably supporting said roller means. Alternatively each rotatable roller means may be supported by spaced support strips spanning said aperture.

In another arrangement, the race means comprises a generally open frame structure supporting one or more circular arrays of radially disposed roller elements. The open frame structure may include structural frame elements of box section elements. Alternatively it may comprise a skeletal structure made up of strip elements.

The turntable may advantageously include drive means for rotating the load-supporting platform. In one embodiment, the drive means comprises an endless elongated drive element engaging the periphery of the load-carrying platform, and a winch pulley connected to a motor. Rotation of the winch pulley causes the platform to rotate. In another arrangement, the drive means comprises a toothed drive portion on the load-supporting platform and a worm drive connected to a motor and drivingly connected to the toothed drive portion by the direct meshing or by means an intermediate idler cog.

Where the load-supporting platform may be subjected to significant lateral loads, due for example to the turntable being on a slope, it may comprise a hub arrangement disposed centrally between the load carrying platform and the ground-engaging member and arranged to constrain said platform and said member for rotation only.

In order to provide progressive transfer of load from the load-supporting platform to the ground-engaging member, the diameters of the rotatable bearing elements and/or the spacing between the opposed rails may be non-uniform. In this way, in an unloaded state, there may be load transfer contact between the upper rail, the rotatable bearing element and the lower rail element only for some of the rotatable bearing elements. In this manner, as the local loading on the load-carrying platform increases, it may deform to urge the rail into contact with a smaller diameter rotatable bearing element and in turn to urge this against the lower rail.

In one arrangement, the upper and lower rails are parallel with there being three sizes of rolling element for progressive support.

In another arrangement, the spacing between the opposing rails and the two aligned pairs of rails is non-uniform. For example the spacing between the two radially inner opposed rails may be less than that of the two radially outer opposed rails, with the rotatable roller elements disposed between the non-uniform spaced rails being of tapered or stepped construction.

In order to reduce wind up, at least one of the rails and/or the rotatable bearing element may be provided with a relieved portion thereby to allow slip.

In one arrangement, the intermediate load transfer means comprises a plurality of radially arranged tapered rollers engaging correspondingly profiled load surfaces on said load carrying platform and said ground-engaging member. In one arrangement, the tapered rollers comprise alternate truncated and extended tapered rollers.

In another arrangement, the intermediate load transfer means may comprise an array of ball bearings. The ball bearings may be provided in a planar support mat or race.

In another arrangement, the ball bearings may be arranged in an array of clusters in a support mat or race.

In another arrangement, the intermediate support means comprises an array of random ball bearings substantially unconstrained in horizontal plane. Thus in this aspect, the invention comprises a turntable for a heavy object such as a car, said turntable including a ground-engaging member and a load-supporting platform each having load surfaces facing each other, said load-supporting platform being supported off the ground-engaging member by an array of load-carrying balls substantially of the same diameter.

In another embodiment, the intermediate load transfer means comprises respective rollers provided on one of the load-supporting platforms and the ground-engaging member and an associated co-operating surface or surfaces. The co-operating surface may be defined by one or more circularly arranged pairs of tracks. Thus in this aspect, the invention provides a turntable for a heavy object such as a car, the turntable including a ground-engaging member and a load-supporting platform, wherein at least one of the ground-engaging member and the load-supporting platform including respective rollers engaging an associated surface on the other thereof.

The spacing between the rollers and the respective co-operating surface may be different for selected rollers, to provide progressive loading.

Preferably, the arrangement includes a guard arrangement provided adjacent the peripheries of the load carrying platform and the ground-engaging member to close or obscure the gap therebetween.

Furthermore, the turntable may include a guard board or ramp extending at least partially around the turntable.

Whilst the invention has been described above, it extends to any inventive combination of the features set out above or in the following description.

BRIEF DESCRIPTION OF THE DRAWINGS

The invention may be performed in various ways, and an embodiment thereof will now be described by way of example only, reference being made to the accompanying drawings in which:—

FIG. 11 is a view of a centre bearing arrangement for use in a modified embodiment;

FIG. 12 is a view of a winch arrangement for rotating the platform in use;

FIG. 13 is a side view of the pulley used in the arrangement of FIG. 12;

FIG. 37(a), (b) and (c) show the cutting profiles for fabricating the upper and lower discs, the assembly of the cut portions into a disc and the use of off-cuts to provide reinforcement, respectively;

FIG. 44 is a horizontal sectional view through a drive mechanism for driving the drive chain of the arrangement of FIG. 43;

FIG. 45 is a view taken on lines X-X of FIG. 44;

FIG. 46 shows the configuration of the components of the drive mechanism when the drive is driving the turntable counter-clockwise;

FIG. 47 is a plan view of the components of the drive mechanism when it is driving the turntable in a clockwise direction;

FIG. 52 is a plan view of an alternative embodiment of drive mechanism, and FIG. 53 is a section view on the drive mechanism of FIG. 51.

DETAILED DESCRIPTON OF THE PREFERRED EMBODIMENTS

Referring now to FIGS. 1 to 10, a first embodiment of turntable constructed in accordance with this invention, and certain variations thereof, will now be described in detail. A key feature in the embodiment of FIGS. 1 to 10 and the subsequent drawings is that the turntable is extremely thin.

Figure 1:
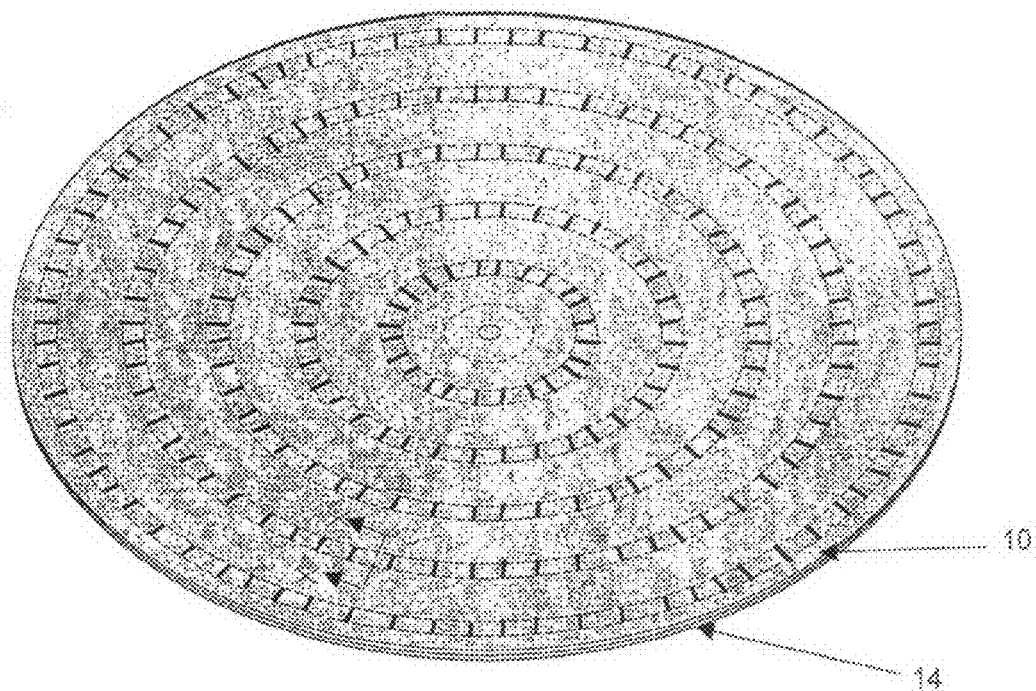
FIG. 1 is a general schematic view of a turntable in accordance with this invention.
Figure 2:
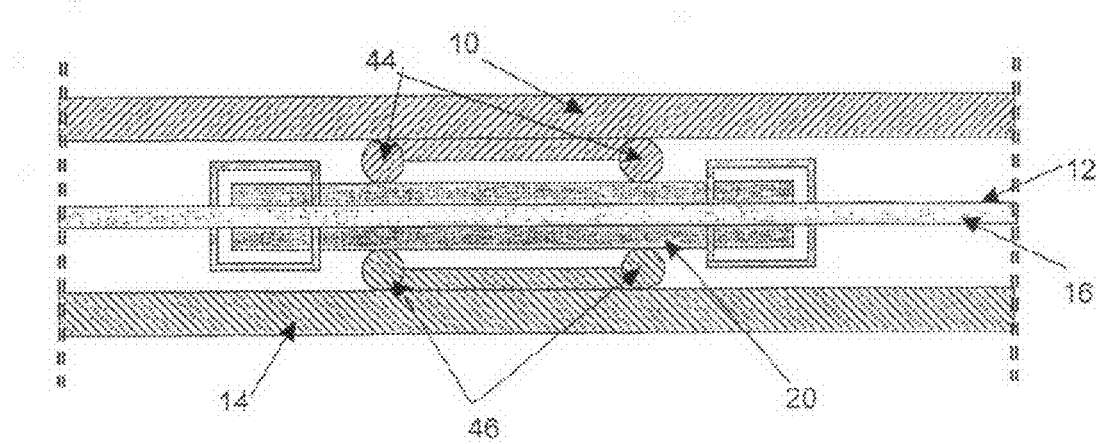
FIG. 2 is a detail showing the typical internal construction of the arrangement of FIG. 1, taken on lines X-X of FIG. 1.
Figure 3:
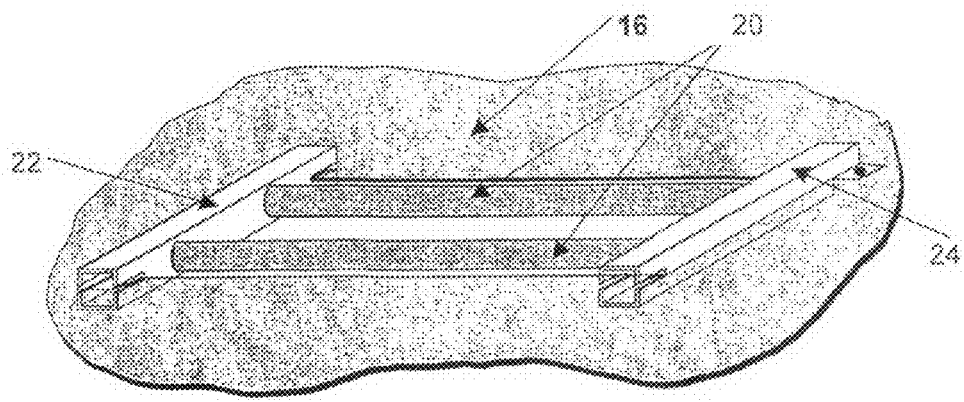
FIG. 3 is a detailed view of an intermediate race for the embodiment of FIG. 1 with the rollers secured by box section.

Referring to FIGS. 1 to 10, the turntable device comprises a disc-shaped load-supporting platform 10, an intermediate race disc 12, and a ground-engaging disc 14. The diameters of the load-supporting platform 10, the intermediate race disc 12 and the ground-engaging disc 14 are substantially the same. The intermediate race 12 is a thin disc intended to rotate at half the speed of the load support platform 10 and furnishing distributed through support in the form of multiple rolling elements held within its structure. The intermediate race disc may take various forms. In FIGS. 2 to 5, the intermediate race disc comprises a sheet 16 with an array of rectangular apertures disposed radially around the rotational axis in rings (five in this particular example). In each aperture, there are mounted two rollers 20 for rotation about radially axis. In the arrangement of FIGS. 2 and 3, the rollers 20 are rotatably mounted in respective inner and outer box sections 22 and 24.

Figure 4:
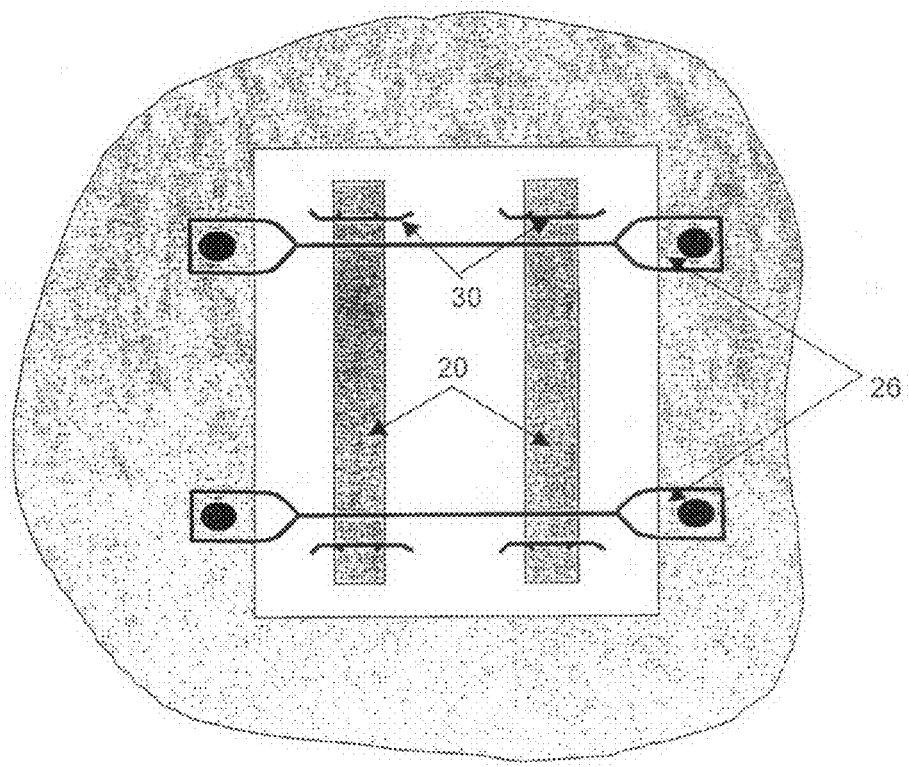
FIGS. 4 and 5 are detailed views of an alternative form of intermediate race using twisted strip members to support the rollers.
Figure 5:
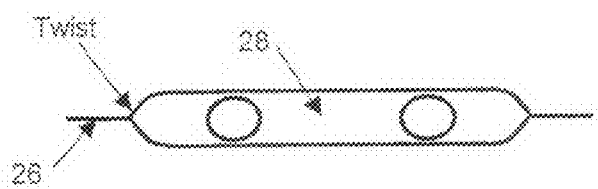

In the arrangement of FIGS. 4 and 5, the rollers 20 are mounted in the aperture by means of band strips 26 which span the aperture and are attached to either side thereof and being twisted to provide a vertical web section 28 having aligned bores which support opposite ends of the rollers 20, the rollers being secured by star lock washers 30.

Figure 6:
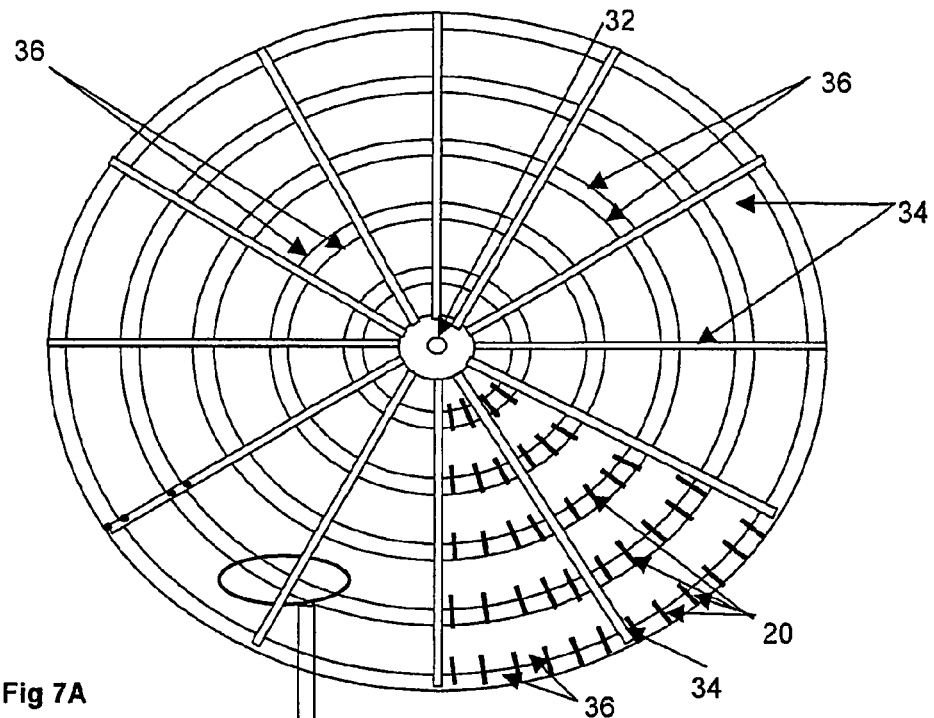
FIG. 6 is a top plan view of a further form of intermediate race comprising an open frame structure made up of band strip material.
Figure 7A:
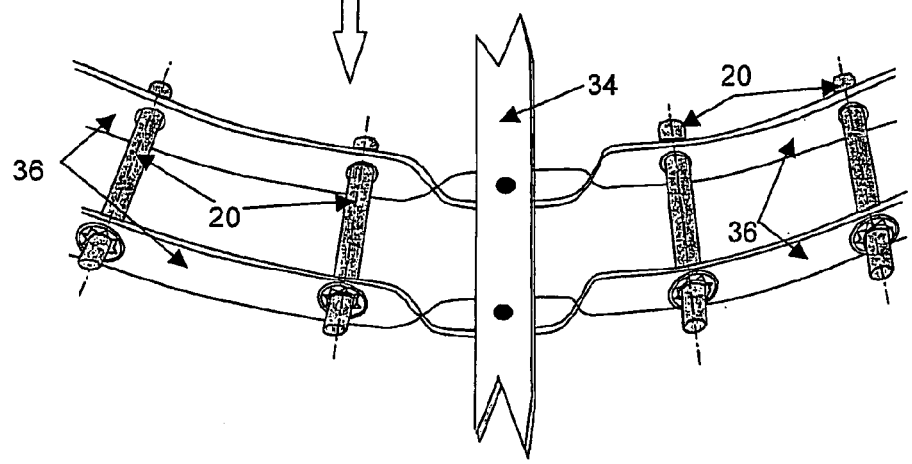
FIG. 7A is a detailed view on the arrangement of FIG. 6.

FIGS. 6 and 7A show a different form of intermediate race disc here in the form of an open frame structure made up of a hub 32 from which radiate (in this example) twelve strip spokes 34 secured between the spokes are (in this example) five pairs of concentric strips 36 providing a vertical web between the spokes but twisting to lie flat immediately adjacent the strip spokes 34 for suitable attachment eg by riveting. Each pair of concentric strips 36 supports a number of rollers 20 aligned radially with respect to the axis of the rotation of the disc and being housed in aligned bores in the inner and outer strips of the pair and secured by star lock washers 30.

Figure 7B:
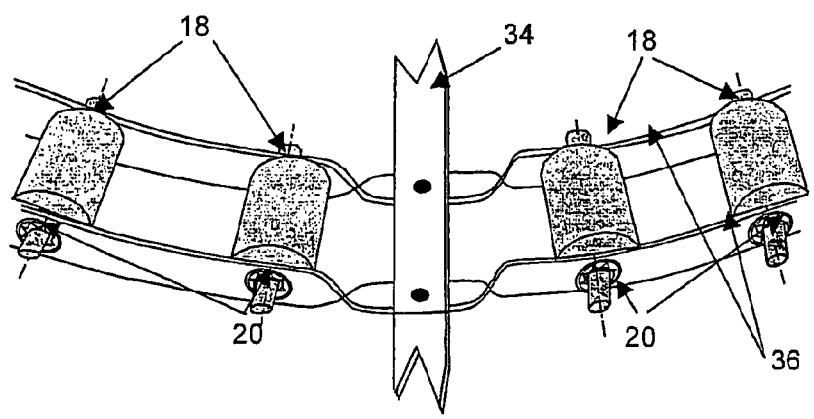
FIG. 7B is a variation of FIG. 7A with rollers on axles.
Figure 8:
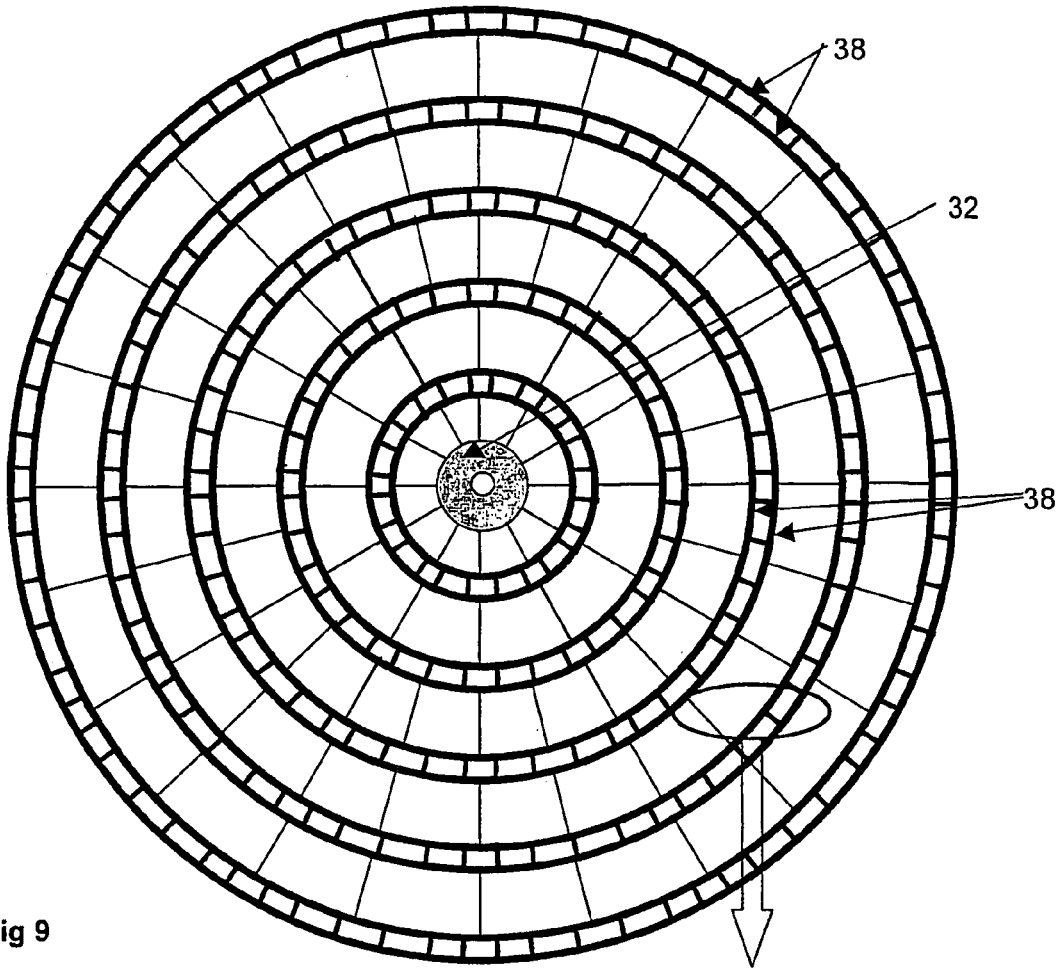
FIG. 8 is a top plan view of another form of intermediate race of open frame structure made up of box section.
Figure 9:
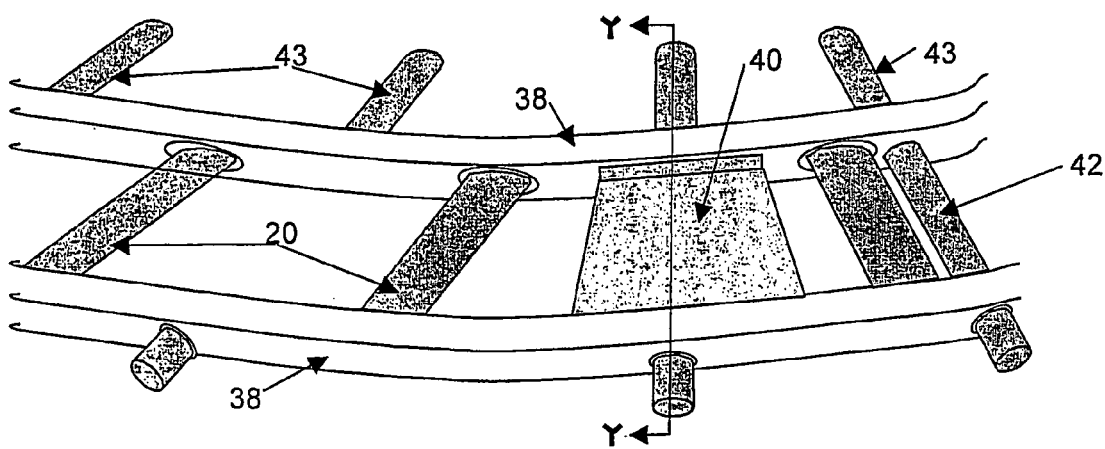
FIGS. 9 and 10 are detailed views on the arrangement of FIG. 8.
Figure 10:
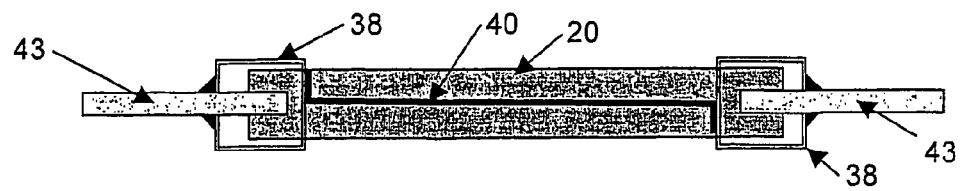
Figure 14:
FIG. 14 is a schematic view through the diameter of the arrangement of FIG. 1.

FIG. 7B shows a variation of FIG. 7A with larger rollers 18 mounted on the previous (smaller) rollers 20, using the latter as an axle. The large roller may be either freely mounted or fixed to the axle; the axle for a freely mounted large roller may itself be freely mounted or fixed to the frame. A particularly preferred embodiment employs a free mounted large roller of Nylon on a free mounted smaller roller. Thus if the larger roller being Nylon is distorted under load so as to inhibit free rotation, then the axle member rotates instead. Under light loads, either or both may rotate.

Referring now the intermediate race disc of FIGS. 8 to 10, this again is of an open frame structure but here there are provided five concentric pairs of inner and outer box section rings 38 the inner and outer box section rings may be secured to each other at suitable intervals by a track spacer which may be in the form of a spacer plate 40 or a spacer rod 42 as shown in FIG. 9. The box section rings 38 support radially aligned rollers 20. Each pair of rings is connected to its neighbour or neighbours by radially directed positioning rods 43.

The intermediate race discs of FIGS. 2 to 10 all provide a number of rings of radially aligned concentric rollers 20 which rotate about a radially axis.

Returning to FIG. 2, the load-supporting platform 10 and the ground-engaging disc 14 are each provided with a plurality of concentric pairs of tracks or rails 44, 46. For each concentric assembly of a pair of upper rails 44, a series of rollers 20 and a pair of lower rails 46, the arrangement is as shown in FIG. 2 with the upper and lower rails of each pair being aligned with the associated rail of the other pair, to either side of the roller.

Referring now to FIG. 11, in certain applications, for example where the turntable is located on a slope, or where the platform is to be driven, it is desirable to have a centre bearing arrangement. As seen in the exploded view of FIG. 11, one suitable arrangement comprises an annular plate 48 attached in the centre of the load-supporting platform 10, the annular plate has a boss 50 which supports the inner element 52 of a taper bearing. The outer element 54 of the taper bearing is received in a ring shaped mounting 56 secured to the centre of the ground-engaging disc 14. This arrangement constrains the load-supporting platform to move in rotation only with respect to the ground-engaging disc 14.

FIGS. 12 and 13 show a winch arrangement drive for driving with load-supporting platform. The drive comprises a wire rope 58 which passes around the circumference of the load-supporting platform 10 (or a drive member attached thereto) and then passes via two idler pulleys 57 around a winch pulley 59 driven by a suitable motor.

Figure 15:
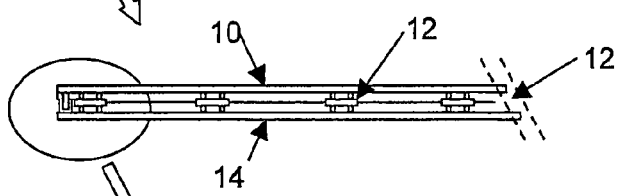
FIG. 15 is a more detailed view showing an intermediate race.
Figure 16:
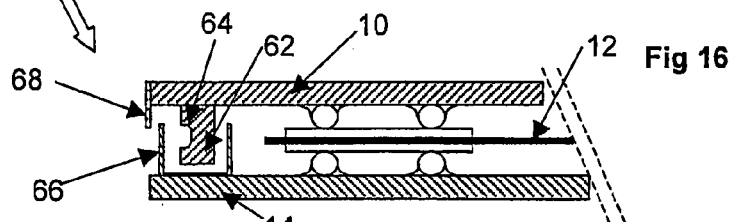
FIG. 16 is a detailed view showing a detailed view of the edge of the turntable arrangement of the winch drive of FIGS. 12 and 13.
Figure 17:
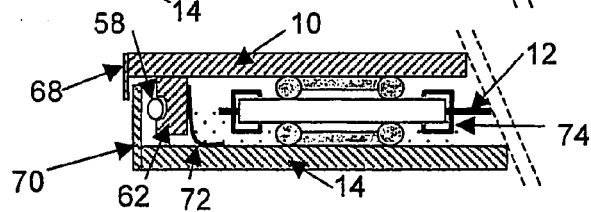
FIG. 17 is a view similar to FIG. 16 showing a lubrication scheme.
Figure 18:
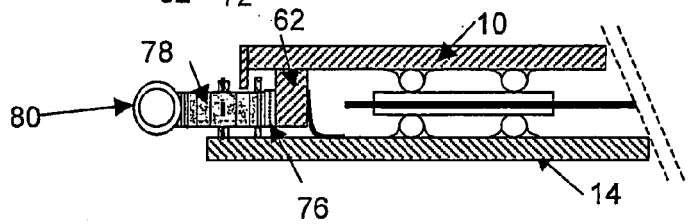
FIG. 18 is a detailed view on the edge of a turntable arrangement fitted with an alternative worm/idler/toothed drive.

Referring to FIGS. 14 to 18, FIG. 14 shows a section through the diameter of the arrangement of FIG. 1 schematically. FIG. 15 is a detailed view showing four of the rail/roller/rail arrangements, and FIGS. 16 to 18 are detailed views on the circumference thereof. In FIG. 16 the load-supporting platform is shown with a drive ring 62 having a peripheral drive groove 64. Opposite the drive ring 62, and projecting upwardly from the ground-engaging disc 14, is an annular square section channel 66 which receives with clearance the drive ring 62 and acts as a limit stop to limit vertical movement of the load support platform 10 with respect of the ground-engaging disc 12. The circular plate or rim 68 is secured to the periphery of the load support platform 10. Items 68, 64 and 62 together provide a labyrinth path to deter and trap debris from ingress into the main body cavity.

Referring to FIG. 17, the arrangement is generally similar in except, instead of the box channel section 66, there is a single outer rim 70 upstanding from the ground-engaging disc 14. In this arrangement an annular sealing flap 72 is secured to the ground-engaging disc 14 and there is an upper portion which is in wiping seal contact with the inner surface of drive ring 62 so as to prevent the radially outward escape of lubricant (shown generally at 74).

Referring to FIG. 18, in this arrangement the drive ring 62 is provided with an outer toothed ring portion 76 which is in meshing engagement with an idler cog 78 which in turn meshes with a worm drive 80 connected to a suitable motor (not shown). In this manner rotation of the motor causes rotation of the load support platform.

Any of the proceeding drive arrangements may be controlled to give a relatively slow rate of rotation—typically 180° in 3 to 30 minutes and are aimed at unattended operation where appropriate safety precautions are in place. A control mechanism can be provided to rotate the turntable through 180°, so that, when used on a drive or in a garage the operator does not have to sit and wait to turn their car, but when they next want to use it—the car has self rotated and is ready for driving off.

Figure 19:
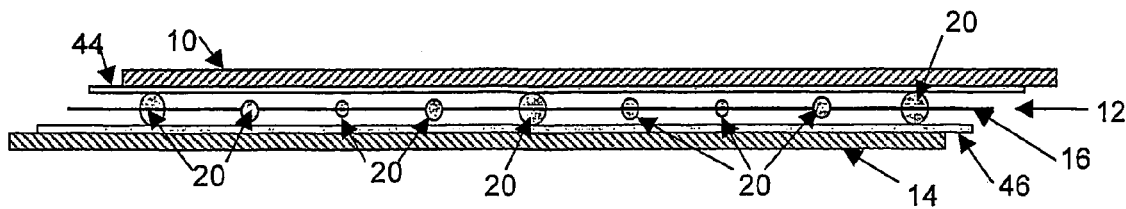
FIG. 19 is a detailed view of a turntable with rolling elements of different sizes for providing progressive support.

Referring now to FIG. 19, this shows a detailed view of a turntable with rolling elements of different sizes for providing progressive support. The view is taken radially inwards showing the load-supporting platform 10, the upper track or rail 44, the intermediate race 12 to be described in further detail below, the lower rail 46 and the ground-engaging disk 14. The intermediate race in this embodiment is formed of a sheet 16 which rotatably mounts a series of radially aligned rollers 20 or rolling elements of different sizes. In this arrangement there are rollers of three different sizes although there may be only two or more than three sizes. As shown the rollers are arranged in the order:—large: medium: small: medium: large: medium etc. In this embodiment, the amount of support varies with the instantaneous local load. The smaller rollers will not contact the upper disc unless the load distorts the upper disc to such an extent that the smaller sized rollers are contacted. Thus, when a localised load is positioned between the larger rollers, the smaller rollers come into play and both limit the deflection and take a share of the load. As a top disc rotates at twice the speed of the centre disc, this will have the consequence that a local static load on the top disc will rotate around the centre disc at half the speed of that of the top disc. To enable this, the top disc, and the top surface covering should have a small degree of flexibility. For example, a flexible top surface covering could be "synthetic turf or grass" or small mosaics with flexible grouting. Synthetic turf or grass furnishes a resilient, flexible, non-cracking surface, with good anti-slip and anti-freeze-up properties.

Figure 20:
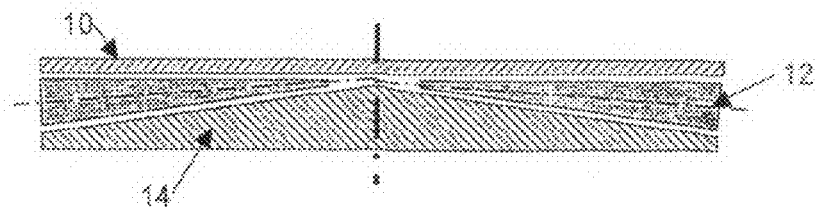
FIGS. 20 and 21 are diametrical across section and schematic top views of a modified turntable arrangement wherein the intermediate race is made up of alternate full length and truncated tapered rollers.
Figure 21:
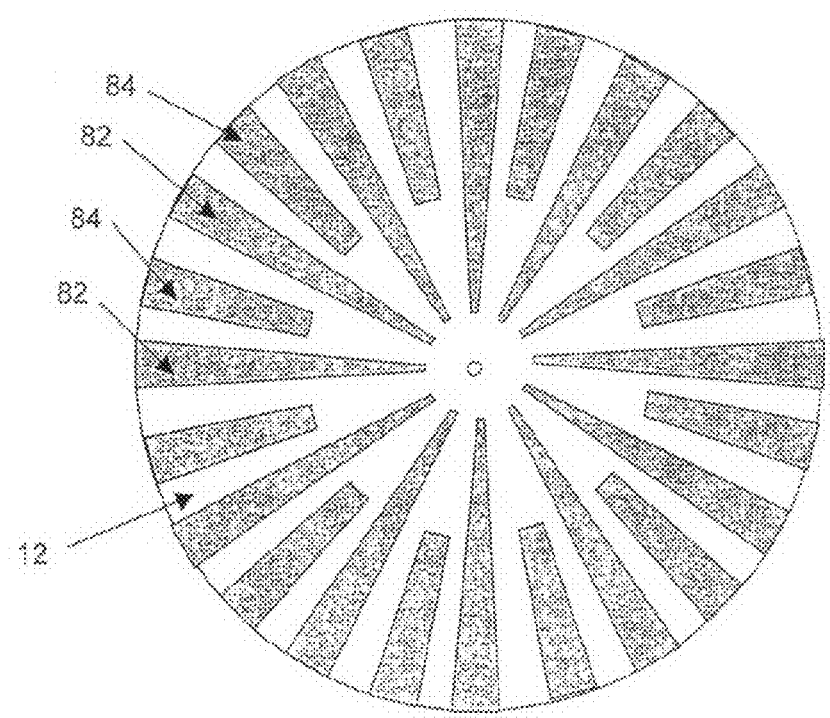

Referring now to the arrangement of FIGS. 20 and 21, in this embodiment, the intermediate race disc 12 incorporates long taper rollers 82 radiating from the centre with additional shorter rollers 84 as the space allows with increasing radius. The taper rollers may be relieved in sections along their axis to reduce the contact area with the load-supporting platform 10, and the ground-engaging disc 14. In this arrangement, the ground-engaging member 14 is provided with a cone-shaped base commensurate with the angle of taper of the rollers to allow for dispersion of debris rainwater and any other contaminants. The tapered elements may be replaced by elements having a number of steps at appropriate points corresponding to the taper diameter at the point where it mates with the tracks or rails. The tapered rollers 82 and 84 are contained in use in a race or frame.

Figure 22:
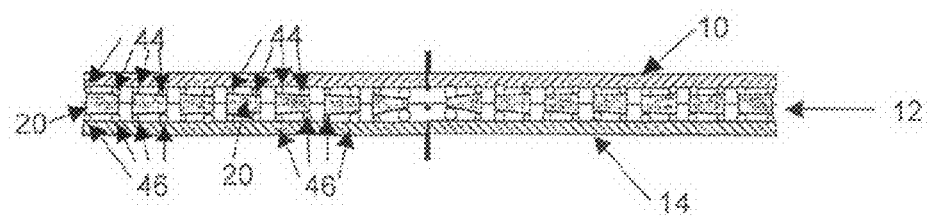
FIG. 22 is a diametrical cross section of a further form of turntable employing multiple short-tapered rollers.

Referring now to FIG. 22, in this embodiment, the rails 44 on the underside of the load-supporting platform 10 are arranged in pairs. Likewise the rails 46 on the ground-engaging portion 14 are of different size and the roller elements are tapered as shown to accommodate the different vertical spacing between the respective low-height rails and the respective high-height rails. The tapers of the roller elements are arranged to accommodate the different distances traveled at the respective radii, given that the larger end of each taper is the same height, commensurate with a flat top disc. The tracks then accommodate the respective tapers thereby reducing wind up. Each taper requirement is such that it generally points to the central vertical axis of the turntable at a height in line with the roller axis.

Figure 23:
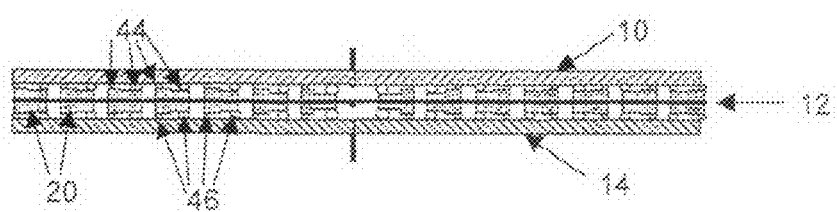
FIG. 23 is a diametrical cross section of another embodiment of turntable arrangement using multiple stepped rollers.

Referring to the arrangement of FIG. 23, here the rails are of similar configuration to that of FIG. 22 but the rollers are of stepped form rather than tapered form.

Figure 24:
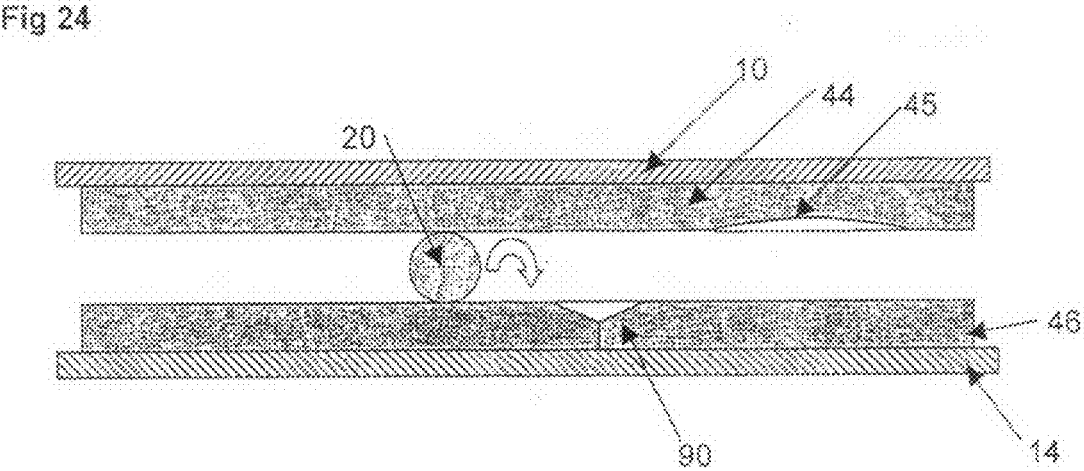
FIG. 24 is a detailed view of the engagement between the roller and the upper and lower rails in an arrangement in which the upper and lower rails are relieved to provide a degree of slippage to release "wind up"

Referring now to the arrangement of FIG. 24, here there is shown a detail of a radially aligned roller 20 running between the upper rail 44 on the load-supporting platform 10 and the lower rail 46 on the ground-engaging disc 14. In this arrangement, the upper and lower rails 44 and 46 are provided with slip notches 90 at their joints and also with scallop slip notches 45 at intervals around the periphery. In this embodiment the centre disc uses rollers 20 of a single diameter. This approach relies on the roller mount to maintain the correct orientation through forced slip on the roller/rail interface. Slip is required as each end of the roller is trying to travel different distances; this "wind up" will tend to force the roller to skew from the required radial orientation. In areas of the turntable with little or no load, slip can occur easily. Where there is a heavy load, eg a car wheel, then the problem is lessened by the fact that the centre disc rotates at half the speed of the upper disc and so the "wind up" due to load is transitional and can be released by slip as soon as the load moves on. Slip can occur when at least one end of the roller is lightly loaded. This tends to happen naturally due to unevenness in the tracks and motion dynamics (eg vibration). In the arrangement of FIG. 24, it is encouraged by the addition of the slip notches and scallops in the track which encourage momentary light loading at one end of the roller element.

Figure 25:
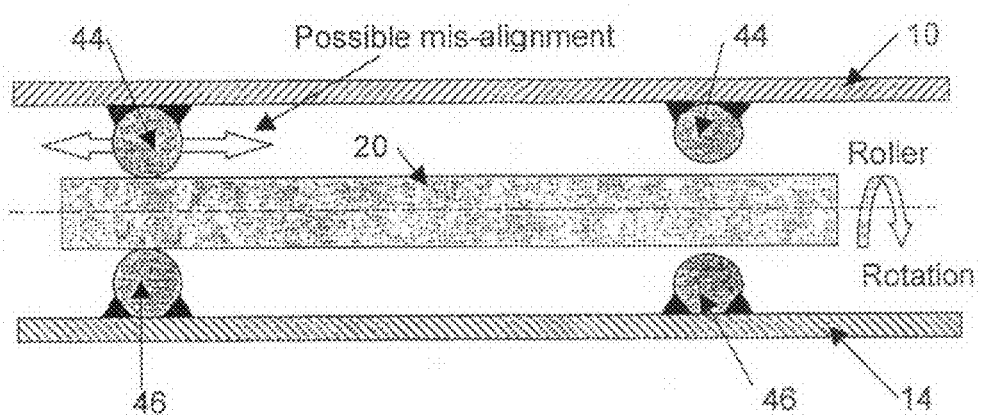
FIG. 25 is a detailed view on the upper and lower rails and a roller arrangement in which one of the rails of the pair has a greater vertical spacing than the other to allow for slippage to reduce windup.
Figure 26:
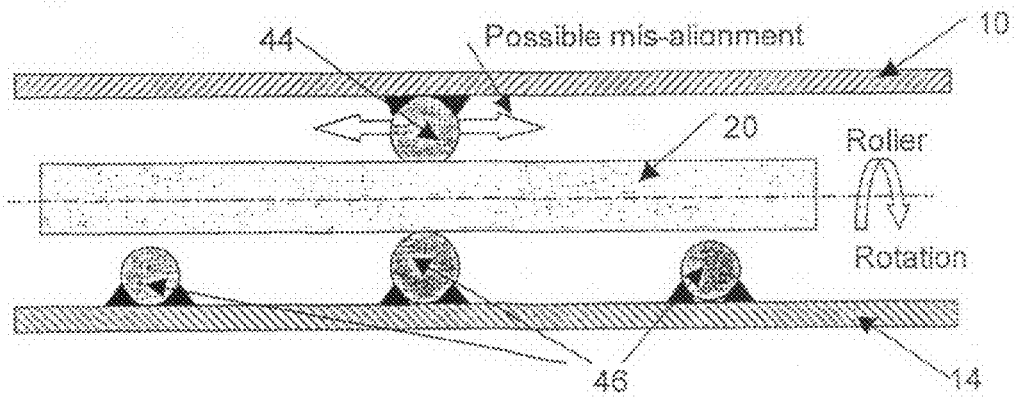
FIG. 26 shows a detailed arrangement in a yet further embodiment having a single upper rail and three lower rails, the heights of the two outer lower rails being less than that of the centre rail.

Referring to FIGS. 25 and 26, in this arrangement the views are taken on one of the radial roller elements 20; in FIG. 25, the vertical spacing between the inner pair of rails (44, 46) and the outer pair of rails (44,46) is different so that the rails at one end of the roller 20 (say the inner end) have a much larger (unloaded) gap than the other, thus encouraging the outer end to take most of the load and allowing the lightly loaded end to slip. In the extreme it could be arranged for one pair of tracks at one end of the roller to take nominally a full load, with the other end acting as a lever to carry only the load resulting from any skewing out of alignment of the upper and lower tracks, which is particularly noticeable when circular section tracking is deployed. In FIG. 26, the arrangement is shown with a single upper rail aligned with a central lower rail and two rails of lower height arranged concentrically therewith. This provides an arrangement with two main opposing rails in the centre of the roller and the two other tracks on one side only to take the out of balance load.

Figure 27:
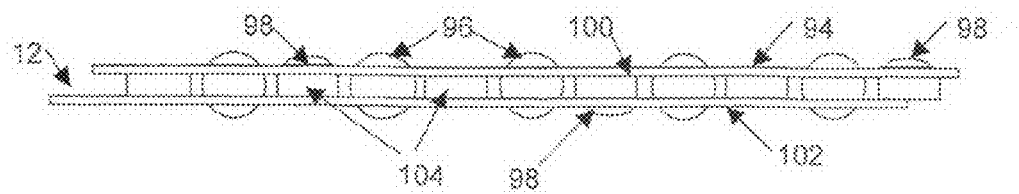
FIG. 27 is a detailed view on another embodiment where the intermediate race comprises an array of ball bearings held in a mat of two parallel spaced plates.
Figure 28:
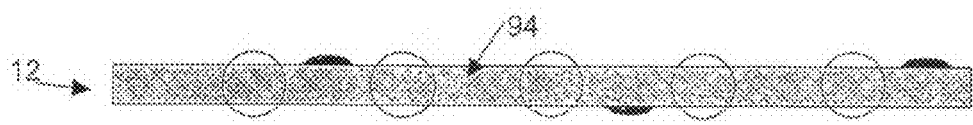
FIG. 28 is a view of an intermediate race arrangement similar to that of FIG. 27 but with the mat being solid.
Figure 29:
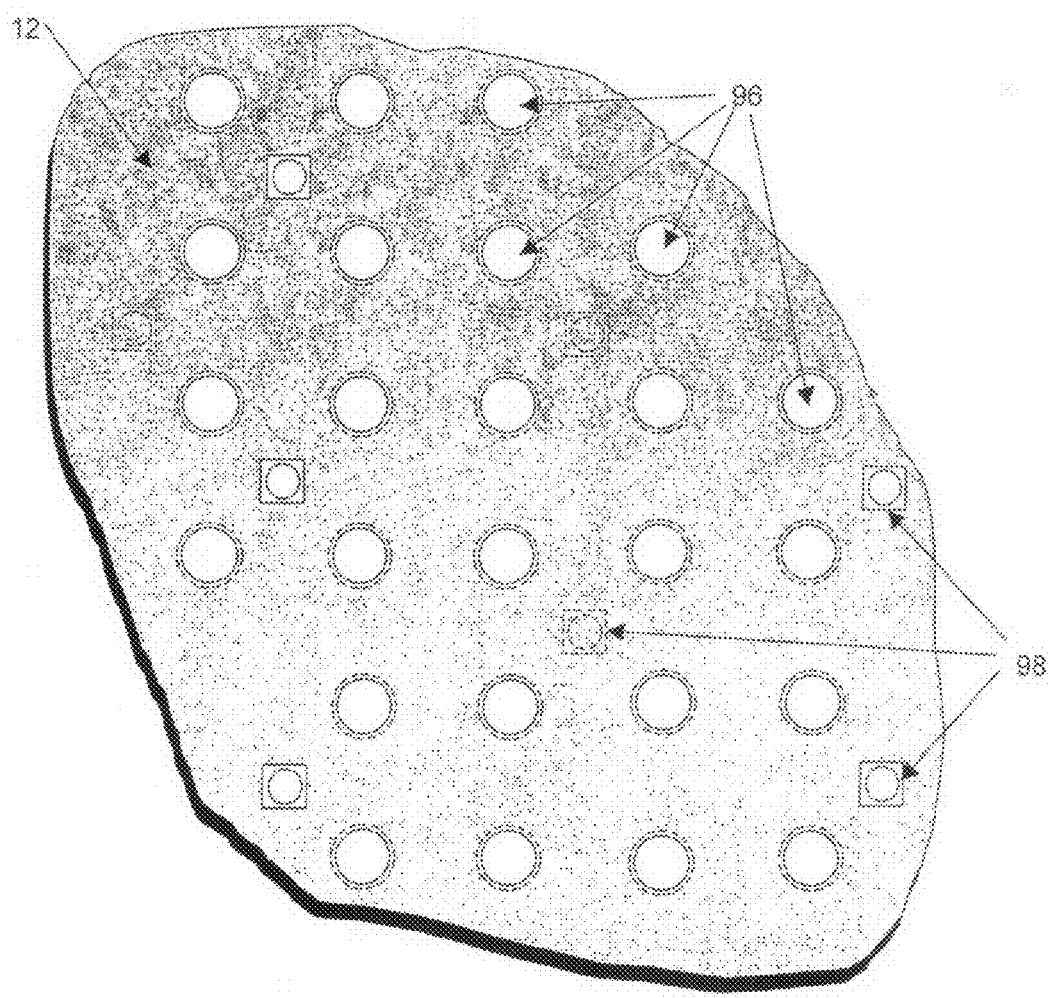
FIG. 29 is a detailed plan view of an intermediate race of the form shown in FIG. 27 or 28, showing a typical distribution of the ball bearings and glide buttons.

Referring now to FIGS. 27 to 29, in this arrangement the intermediate race disc 12 comprises a thin support 94 carrying an array of ball bearings 96 (or roller bearings) and also having thereon an optional mat support in the form of a glide button 98 or strip. In the arrangement of FIG. 27, the support 94 is in the form of spaced upper and lower plates 100 and 102 bridged by a filler material 104. In the arrangement of FIG. 28, the support 94 is in the form of a solid plastic mat of, for example, Nylon (Registered Trade Mark) or other polymer material. These arrangements are shown in plan view in FIG. 29. Thus, this shows a typical mat with a regular pattern and single size of balls; variations include irregular patterns and a mixture of ball sizes.

Figure 30:
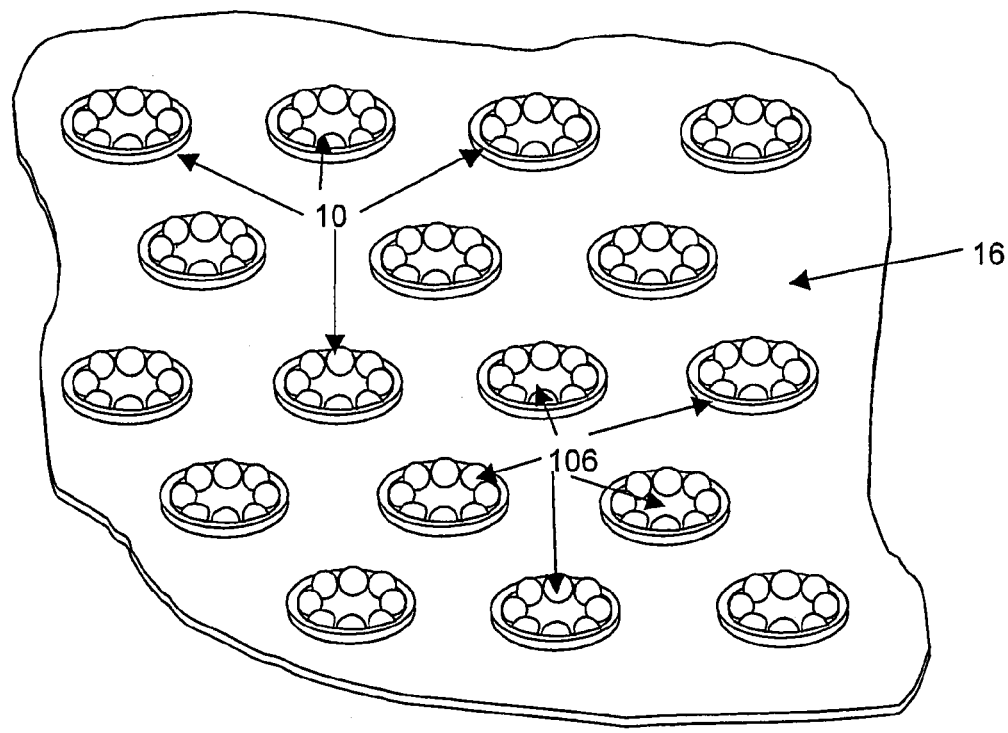
FIG. 30 is a view of a further form of intermediate race arrangement in which the ball bearings are mounted in a regular array of clusters.

Referring now to FIG. 30, in this arrangement the intermediate race disc comprises a sheet 16 which has provided therein an array of individual thrust races 106 each containing a series of ball bearings 96. The individual thrust race is mounted in the sheet and act as a "super race".

Figure 31:
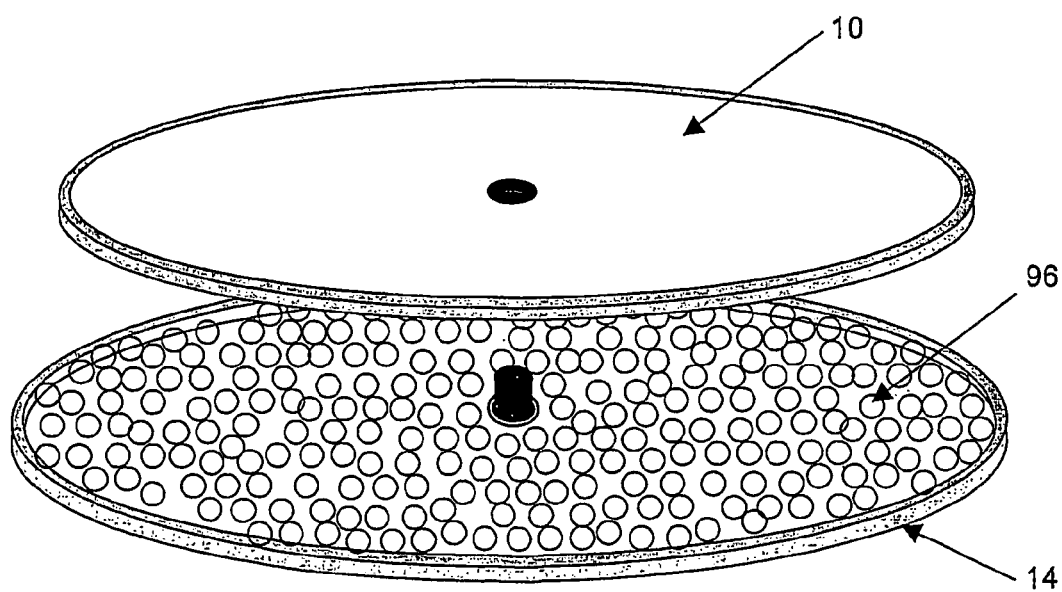
FIG. 31 is an exploded view of a further embodiment of this invention in which the intermediate race is in the form of a generally random array of ball bearings.

Referring now to the arrangement of FIG. 31, in this arrangement there is shown the upper load support platform 10 and the ground-engaging disc 14 and therebetween is an intermediate race here in the form of a random array of ball bearings 96 of the same diameter but confined at the edges to trap them between the load support platform and the ground-engaging disc, to provide a "loose ball concept."

Figure 32:
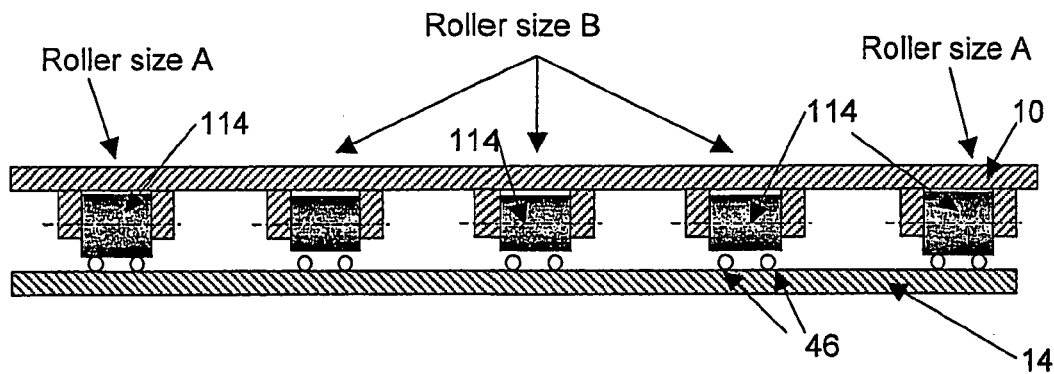
FIG. 32 is a detailed view of a further embodiment of this invention wherein the intermediate race comprises an array of rollers secured to the underside of the flexible load platform which co-operate with respective rails secured to the ground member.
Figure 33:
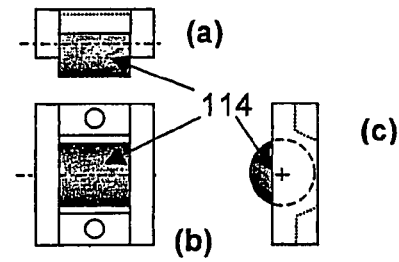
FIG. 33(a), (b) and (c) illustrate typical designs for the rollers in the embodiment of FIG. 32.

Referring now to FIG. 32, in this arrangement the intermediate race disc 12 is effectively integral with the flexible load support platform 10 and rotates therewith. The ground-engaging disc 14 has a series of concentric pairs of rails 46 and the load support platform 10 is provided with a series of multiple roller bearing assemblies 114 which is shown in more detail in FIGS. 33(a) to (c). The roller bearings may be of different diameters to facilitate the progressive support technique described above to reduce drag when the table is turned.

Figure 34:
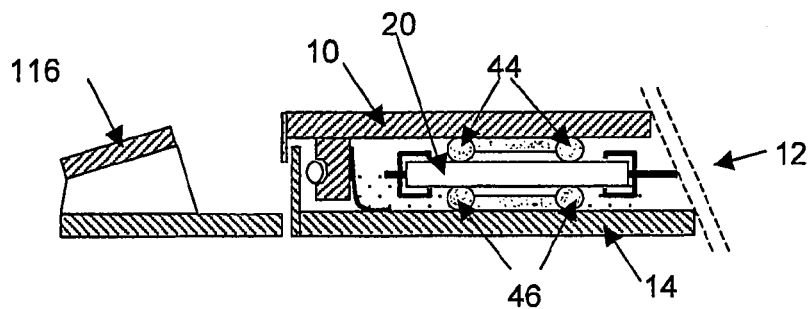
FIG. 34 is a detailed section view taking on the periphery of a turntable in accordance with this invention fitted with a shallow peripheral guard band or ramp.
Figure 35:
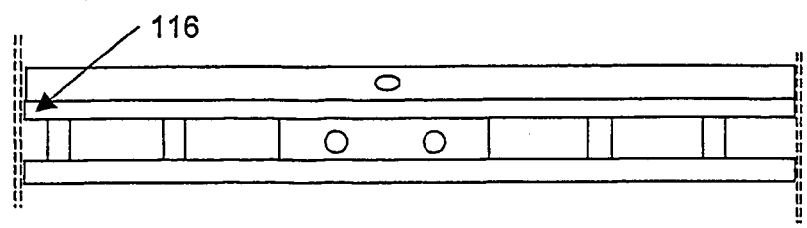
FIG. 35 is a detailed view on the front of the arrangement of FIG. 34.

Referring now to FIG. 34, this shows the periphery of a turntable in accordance with the invention and, radially outwardly thereof, a guard band in the form of a ramp 116 to facilitate driving on and off the turntable. A detailed elevation of the guard band is also shown in FIG. 35.

Figure 36:
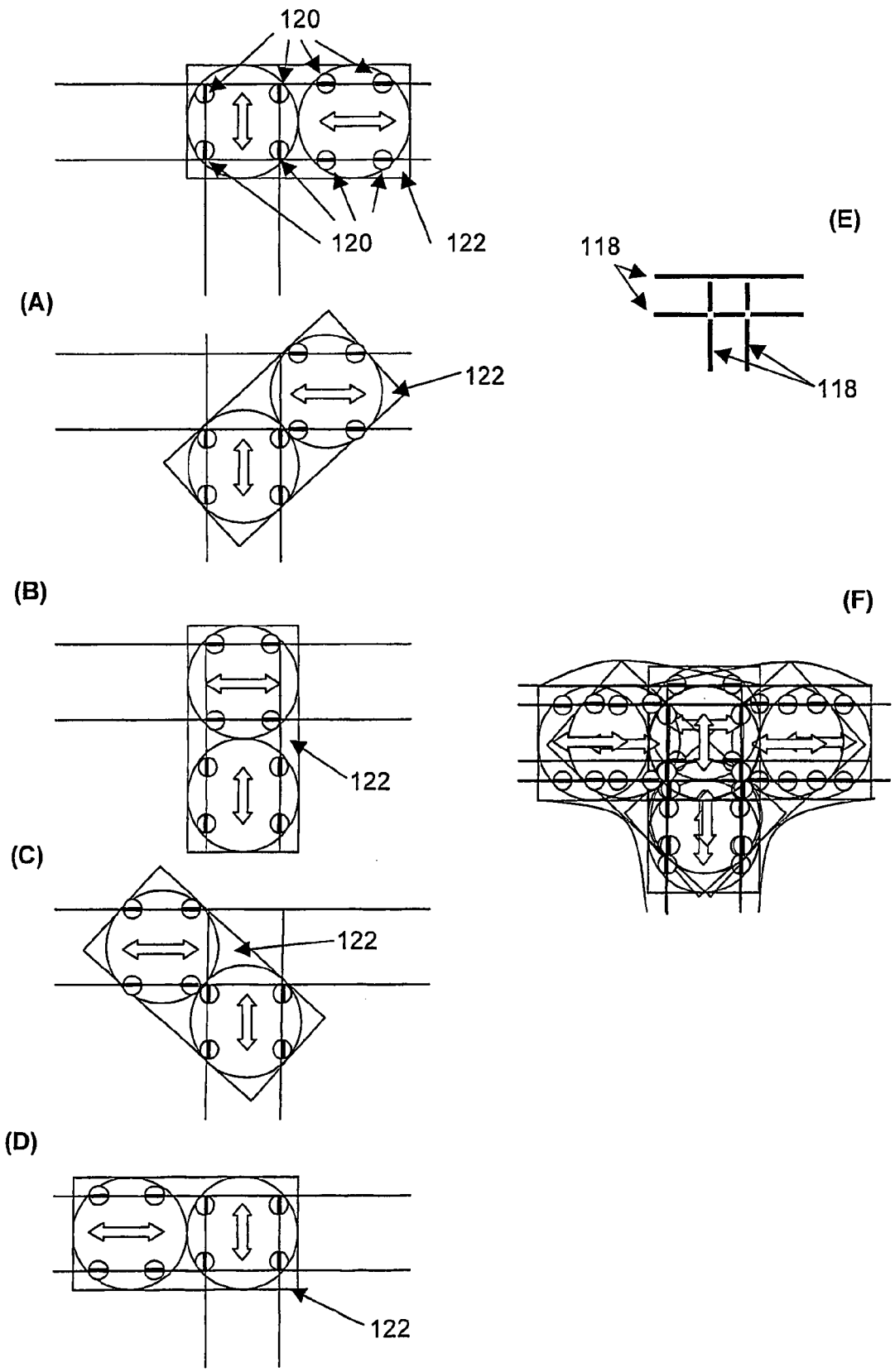
FIG. 36(a) to (f) is a view of an arrangement in accordance with this invention, comprising two turntables as described above fitted on a "T" rail system.

Turning to FIG. 36, this shows an arrangement which makes use of two turntables of the type described above in conjunction with a T-shaped parallel spaced track arrangement. In this arrangement, the ground-engaging disc 14 of each platform assembly is supported for linear sliding movement on a pair of rails 118 (one being mounted on the stem of the T and the other being mounted on the cross of the T). Mounting of the ground-engaging disc 14 on the pair of tracks is by means of four track followers 120 secured to the underside of the ground-engaging disc and engaging the appropriate set of rails. As shown in FIG. 36(e), the cross over points between the rails 118 have breaks to allow each platform to move along the full extent of its track. The two load-supporting platforms 10 are secured side by side by a rectangular platform cover 122.

The sliding constraints on the ground-engaging discs, and the ability of the load support platforms to rotate relative to the ground-engaging discs means that the device illustrated in FIG. 36 can be shuttled between a number of configurations as shown in sequence from FIG. 36(a) to FIG. 36(d), effectively executing a three point turn. FIG. 36(f) shows the locus of movement of the rectangular platform 122 between these positions.

Referring now to FIG. 37 this shows a cutting diagram for cutting out sections from a rectangular stock sheet to fabricate a large disc. As can be seen, the off-cuts can actually be used to provide a strengthening central structure.

Figure 38:
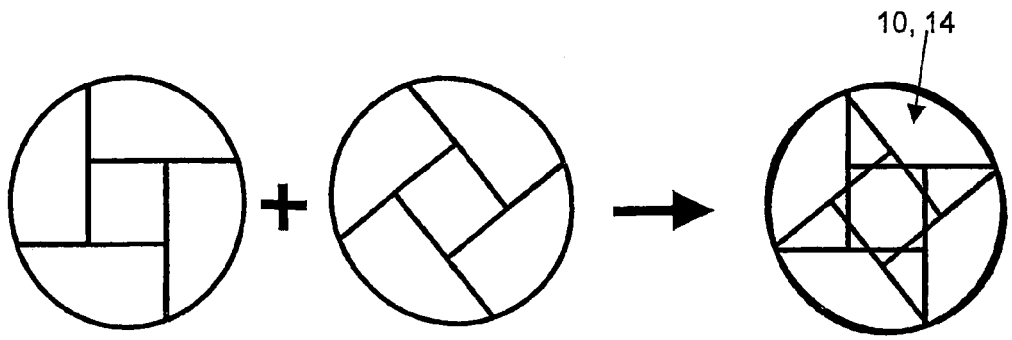
FIG. 38 shows an alternative multi-layer construction of the load-supporting platform and/or the ground-engaging disc.

FIG. 38 illustrates how two discs of the form of FIG. 37(b) can be stacked in staggered and inverted relationship to provide a multi-layer disc which avoids any through joints. This construction may be used for the load-supporting platform 10 and/or the ground-engaging disc 14.

Figure 39:
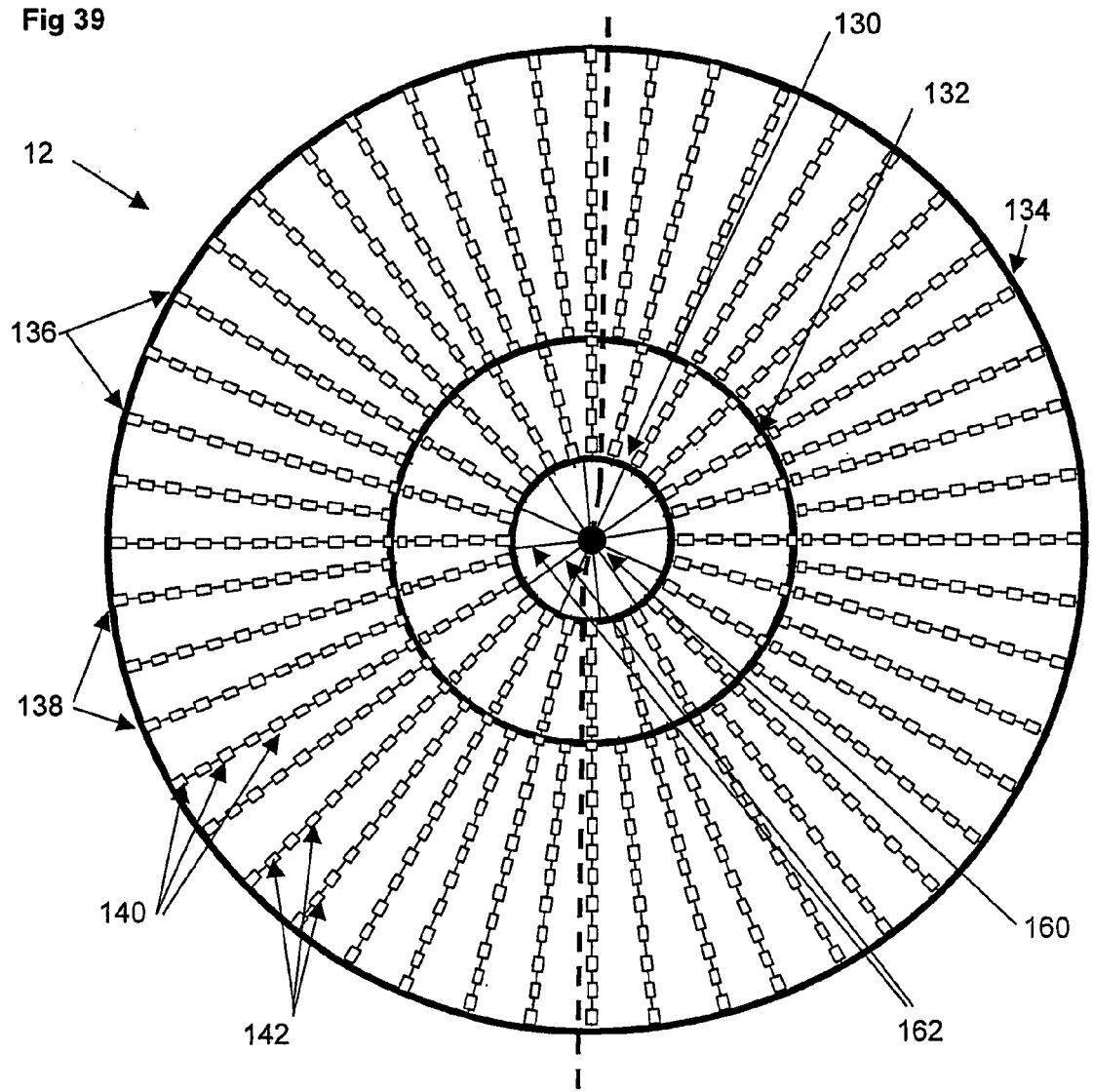
FIG. 39 is a plan view of another embodiment of intermediate race showing how the race may be constructed in sections.

FIG. 39 illustrates an embodiment of intermediate race disc 12 made up of inner, intermediate and outer support rings 130, 132 and 134 and alternate full length and intermediate length spokes 136 and 138 respectively. Each of the spokes has threaded thereon alternate large and small free-running rollers 140, 142. As indicated by the dotted line in FIG. 39, the race may be constructed in generally diametrical sections to assist transportation.

Figure 40:
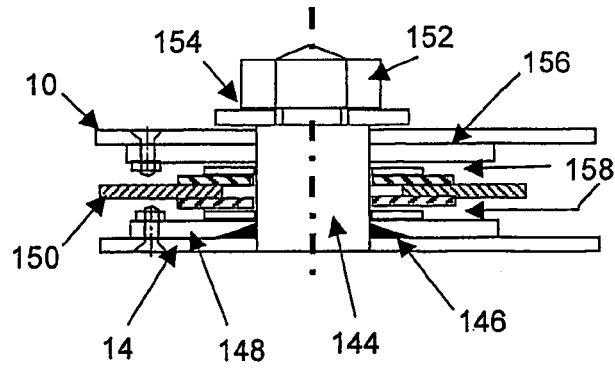
FIG. 40 is a detailed view on another embodiment of hub arrangement.

FIG. 40 shows a hub arrangement in which a central pinion 144 is secured by welding 146 to the ground-engaging disc 14, with there being a strengthening plate 148 to locate the pinion. Over the pinion is fitted the central rotary member 150 of the intermediate race 12. The load-supporting platform 10 fits over the pinion 144 and is secured by a nut 152 and retaining washer 154. The load-supporting platform 10 is provided with a strengthening disc 156. Washers 158 may be provided intermediate the central member 150 and the ground-engaging disc 14 and the load-supporting platform 10 respectively.

Figure 41:
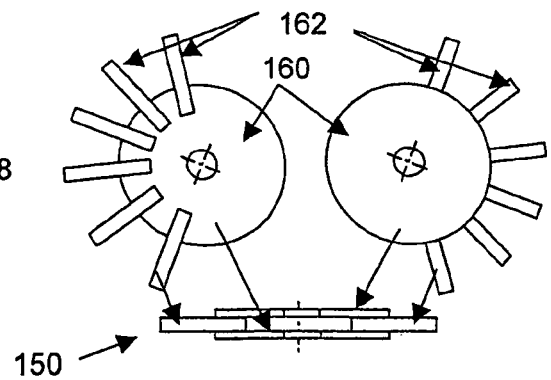
FIG. 41 is a schematic view showing a possible hub arrangement made up of two halves.
Figure 42:
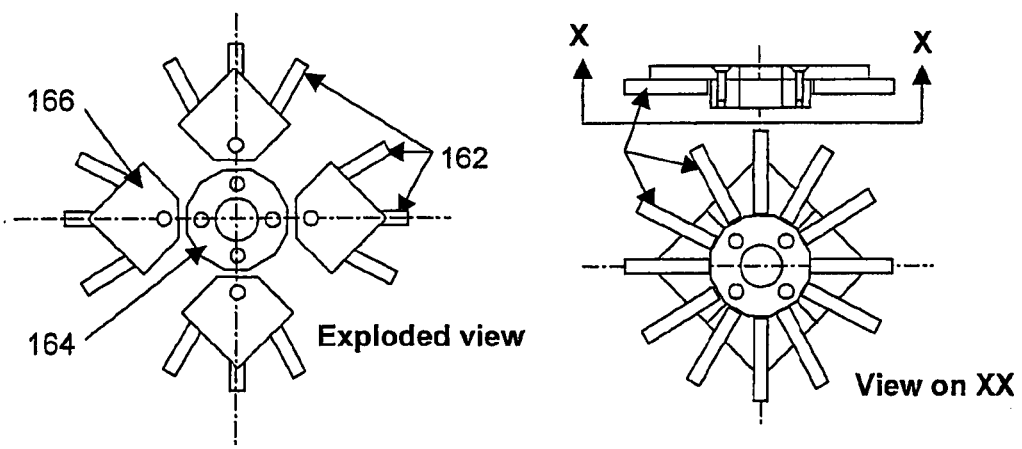
FIG. 42 is a schematic view of a hub arrangement for a race made up of four identical sections.

FIGS. 41 and 42 show arrangements whereby the race may be made in sections. In FIG. 41 the central rotary member 150 is made up of two central discs 160 each having half the number of inner spokes 162 welded to it to provide two identical halves whereby one can be inverted and stacked with the other to provide an arrangement with equi-spaced inner spokes 162.

In FIG. 42, the hub arrangement comprises a central rotary member 164 to which quadrant sections 166 each carrying a quarter of the number of inner spokes 162 is attached. The quadrants may be brought together and bolted to the central member 164 as shown.

Figure 43:
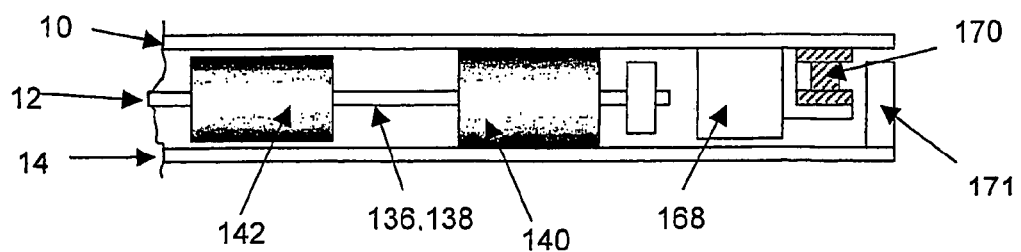
FIG. 43 is a detail on the outer diametrical section of a turntable in accordance with this invention incorporating a peripheral driven chain.
Figure 48:
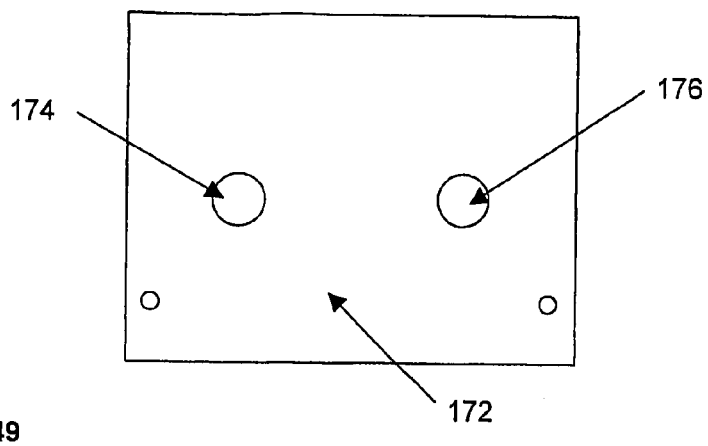
FIG. 48 is a plan view of the base plate of the drive mechanism.
Figure 49:
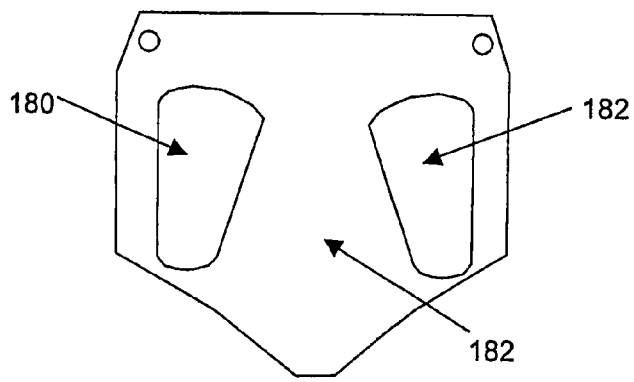
FIG. 49 is a plan view of the moveable sprocket support plate.

FIG. 43 shows a detail on the outer radial section of the turntable showing a driven chain arrangement. Here a ring shaped support member 168 secured to the upper side of the upper disc 10 and extends peripherally around it. The height of the member 168 is slightly less than the unloaded gap between the load-supporting platform 10 and the ground-engaging disc 14. One of the functions of the member 168 is to limit flexing movement when a vehicle rolls on or off the adjacent periphery of the load-supporting platform 10. This may be used to restrict or stop rotation of the platform 14 at roll-on or roll-off of a vehicle wheel to provide an automatic stop feature. The member 168 also provides a support for a driven chain 170 which is secured around the member to prevent circumferential movement relative thereto. An outer debris guard ring 171 upstands from the ground-engaging platform to prevent ingress of dirt and debris. With this design of drive, the driven chain is fixed around the perimeter of the turntable as a fixed entity. It is not required to flex as would normally be expected of a chain, and it does not matter whether the chain rusts or seizes as it is merely functioning as a set of rugged and reliable teeth on the turntable.

Referring to FIGS. 44 to 49, they show a drive mechanism for imparting drive to a turntable via the peripheral driven chain 170. The mechanism comprises a fixed base plate 172 from which upstand first and second spigots 174, 176 respectively which constrain the movement of a floating assembly 178 by the spigots 174, 176 projecting through respective shaped apertures 180, 182 in a sprocket support plate 184. A drive sprocket 186 is rotatably mounted on the support plate 184 by a vertical axle and driven through a motor 188 and worm drive 190 secured to the floating assembly 178. The sprocket support plate 184 has two glide buttons 196 and 198 which provide a bearing surface against the base plate 172. A pair of tension springs 192, 194 extend between respective attachments to urge the drive sprocket 186 into toothed engagement with the driven chain 170 when in the rest position (with no torque applied). These springs ensure that, at rest, the drive sprocket is always in engagement with the drive chain 170 even if there are slight variations in diameter of the support to which the driven chain is attached, because the mechanism allows floating horizontal movement of the sprocket.

As soon as the motor is operated to drive the turntable torque is transmitted through the drive sprocket 186. A reactive torque tends to cause the drive sprocket support plate 184 to rotate in the opposite direction, thus further urging the drive sprocket 186 into engagement with the driven chain 170. Thus, as seen in FIG. 46, when the drive sprocket 186 rotates clockwise (to turn the turntable counter-clockwise) the torque transmitted tends to cause the drive sprocket plate to rotate counter-clockwise with the spigot 176 engaging the narrower end of aperture 182 and the spigot 174 tending to move towards the wider end of aperture 180. This effectively winds the drive sprocket into tighter engagement with the driven chain. FIG. 47 shows operation in the opposite sense.

It will be noted therefore that the springs ensure initial contact between the drive sprocket and the driven chain. When the sprocket turns it will press into the chain with a force proportional to the resistance of the chain moving. Thus the greater the resistance to the turntable rotation, the more the pressure is exerted on to the chain to maintain grip. Typically the motor will stall before the sprocket will slip on the chain as the sprocket will have driven into a wedge between the relevant spigot and the chain. With the sprocket driven into the chain, the mechanism allows the sprocket to follow the chain in a range of vertical movements even including titled angles. Thus the top plate assembly may be considered to be a floating assembly accommodating vertical, horizontal and tilting movements.

Figure 50:
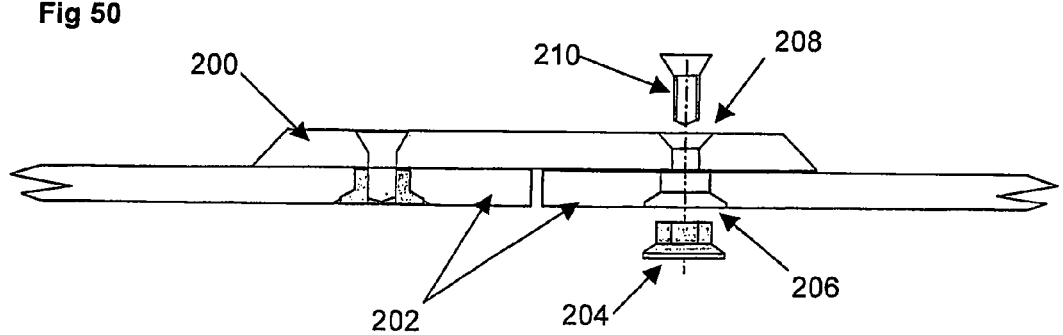
FIG. 50 is a detail view of a fixing technique for connecting sub-components of the turntable or the load-supporting platform together.

Referring now to FIG. 50, is shown a fixing technique to join plates together for either the load-supporting platform 10 or the ground-engaging disk 14. In this arrangement, two plates 202 are connected by a lap plate 200 with the use of a flange nut 204 received and an interference hole 206 with counter-sink or counter-bore, cooperating with a counter-sunk screw 210 received in a clearance hole 208 in the lap plate. This technique allows the joining of plate material with no significant projections on either side. This is particularly useful on material that is too thin for blind hole rivets. The arrangement may be configured so that the flange nut has a hexagonal profile which thereby furnishes retention and prevents rotation. This is particularly appropriate for use where the nut side of the work is not accessible during top level assembly. A number of different screw types may be used for example, conventional, hexagonal head screws and bolts, and the arrangement allows damaged flange nuts to be easily replaced.

Figure 51:
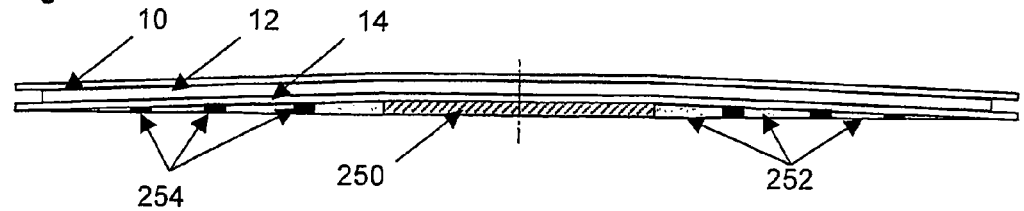
FIG. 51 is a sectional view showing one option of mounting the turntable for increased water dispersion.

In order to provide good shedding or dispersal of rain, the turntable may be made, or laid, with the centre portion slightly raised relative to the outer circumference thereby aiding dispersion of water, mud and debris from the structure. Referring to FIG. 51 this could be achieved by providing an additional plate 250 under the central portion of the ground-engaging disk with the remainder of the ground-engaging disk being supported by grit or sand 252 tapering off to the outer circumference. The plate 250 is only about ⅛ of total area, and this provides a flattened top to keep the total height down significantly. This also makes the plate is more pleasant to walk over, and makes the centre area is less accommodating to flexing. Alternatively, a tapered mat could be provided or a combination of both in annular rings, with each mat ring 254 being of a single thickness that decreases as it approaches the outer circumference. This arrangement also provides more allowance for an uneven supporting surface and the inherent general flexibility of the turntable easily accepts this adaptation. If required the plates can be profiled to accommodate this as the natural profile.

Referring now to FIGS. 52 and 53, an alternative embodiment of motor support assembly is illustrated. This assembly provides a hidden motor with a single point swinging engagement. As seen in FIG. 53, the assembly is designed to be sunk in the ground next to the turntable, being housed in a sunken box enclosure 220, which underlies the ground-engaging platform 14. The box is provided with a box top 214 which also acts as a fixing member. The box top 214 is secured to the ground-engaging disk 14 by means of fixing bolts or lugs 212.

A swinging arm 224 is mounted in the top of the box 220 for swinging and limited translational movement as indicated by the arrows in FIG. 51, being supported at one end by a support 218 mounted on a support block 226 and at its other end by a pivot 222 which is welded to the box top 214. The swinging arm 224 supports a motor gearbox and flange assembly 242 which drives via a motor shaft 228, a drive sprocket 230. The swinging arm 224 is held for limited movement about the pivot 222 by means of a washer and split pin or C clip assembly 240. The drive sprocket 230 engages a driven chain 170 attached to the load-supporting platform 10. A pair of springs 216 extend between a fixing point on the swinging arm 224 and respective mounting pegs on the box top 214. A drive over plate 232 is shown in dotted lines in FIG. 52 only and covers a removable top lid 234 which can be removed for servicing. A sealing washer 236 surrounds the motor shaft 228 and sits on the removable top lid. The box is provided with drain holes 238. There is a step 246 provided in the side wall of the box to support the drive over plate 232. The space 248 within the box can house a second smaller box containing control and safety circuits.

This assembly provides a power drive that can be mounted with its upper surface approximately flush with the upper surface of the turntable 10. The arrangement allows the motor assembly to move radially and axially relative to its pivot point; when it is moving radially, encouraged by the operation of the motor, the drive sprocket 230 will tighten itself onto the driven chain in an amount proportional to the resistance offered by the turntable.

The drive box can be simply bolted onto the underside of the ground-engaging disk 14 at its periphery. The complete active drive assembly motor gearbox 242, swinging arm 224 and drive sprocket 230, can easily be inserted and removed through the access provided by the removable top lid 234 thereby providing ease of maintenance or replacement. In another arrangement, the drive over plate 232 could be hinged to give easy access and protection to the controls mounted in the vicinity of the removable top lid 234.

Numerous modifications to the embodiments described above are possible. For example the rollers may preferably be made of polymer material (particularly Nylon RTM) as this yields quieter operation, is resistant to corrosion and may elastically deform under very heavy load conditions providing an extending contact area thus avoiding damage to the roller and the mating surfaces.

The drive mechanism may be adapted so that it incorporates an automatic stop at preset locations. The shape of the load support platform and/or the ground-engaging disk may be varied according to particular requirements. For example, pieces may be added adjacent to the turntable to give it a desired profile, for example rectangular commensurate with a parking area or a portion of a driveway.

The turntable may be laid either on the surface of the ground, or recessed into the surface.

The invention claimed is:

1. A turntable for a heavy object, said turntable including:
   a ground-engaging member;
   a load-supporting platform, said ground-engaging member and said load-supporting platform each having load surfaces facing each other; and
   an intermediate load transfer means comprising a cage means rotatably mounted for rotation relative to both said ground-engaging member and said load-supporting platform about a generally vertical axis, the load-supporting platform is supported off the ground-engaging member by said intermediate load transfer means,
   wherein the cage means holds a plurality of rotatable rollers which are distributed across an extended region of said load surfaces and which are each constrained to rotate about a respective rolling axis which extends generally radially with respect to said generally vertical axis to allow rotation of said load-supporting platform with respect to said ground-engaging member about said generally vertical axis, and
   said ground-engaging member and said load-supporting platform are each formed from a single sheet member or sheet members attached together, to flex as one and are each configured to flex in use over at least the extended region, whereby the assembly comprising said ground-engaging member said cage means and said load-supporting platform is able to flex in use.

2. The turntable according to claim 1, wherein said ground-engaging member and said load-supporting platform are each of disc or annular form and each of a similar external diameter.

3. The turntable according to claim 1, wherein at least one of said ground-engaging member and said load-supporting platform is constructed of a plurality of sheet members.

4. The turntable according to claim 1, wherein the load surfaces on each of said ground-engaging member and said load-supporting platform each comprise a plurality of circular rails concentric with the intended axis of rotation of said load-carrying platform, with at least one of the rails on the ground-engaging member being aligned with a corresponding rail on the load-supporting platform.

5. The turntable according to claim 4, wherein the rails on said ground-engaging member and said load-carrying platform are arranged in pairs, and the rollers of said intermediate load transfer means are arranged in one or more respective circular arrays of radially disposed rotatable rollers, with the rollers in each array co-operating with respective pairs of rails on said load-carrying platform and said ground-engaging member.

6. The turntable according to claim 1, wherein said cage means comprises a plate means provided with one or more circular arrays of apertures, each aperture containing at least one rotatable roller.

7. The turntable according to claim 1, wherein said cage means comprises a generally open frame structure supporting one or more circular arrays of radially disposed rollers.

8. The turntable according to claim 1, wherein the rollers of said cage means act directly on the said load-supporting platform and said ground-engaging member for the purpose of allowing the load-supporting platform to rotate with respect to the ground-engaging member, and in which the rollers are mounted with respect to said cage on an axle which may be fixed or rotating.

9. The turntable according to claim 1, including drive means for rotating said load-supporting platform, wherein said drive means comprises an endless elongate drive element engaging the periphery of the load-carrying platform and a winch pulley connected to a motor.

10. The turntable according to claim 1, including drive means for rotating said load-supporting platform, wherein said drive means comprises a toothed drive portion on said load-carrying platform and a worm drive connected to a motor, and meshing directly with said toothed drive portion or with an intermediate idler cog.

11. The turntable according to claim 1, including drive means for rotating said load-supporting platform, wherein said drive means comprises a drive chain secured to extend circumferentially around said load-supporting platform and a drive member for engaging said chain.

12. The turntable according to claim 11, wherein said drive member is mounted on a floating assembly which is biased to urge said drive member into engagement with the load-supporting platform or said chain, wherein said floating assembly includes two pivot arrangements about which the assembly pivots to urge the drive member further into engagement with the load-supporting platform or said chain upon an increase in the torque transmitted by said drive member, each being operational in a respective given direction of rotation of the drive member.

13. The turntable according to claim 12, wherein said arrangement uses a friction drive instead of a toothed drive.

14. The turntable according to claim 5, wherein the spacing between opposing rails in two aligned pairs of rails is non-uniform, and the rotatable rollers disposed between the non-uniform spaced rails are of stepped construction.

15. The turntable according to claim 1, wherein said rollers are of different diameters, whereby in use with a load, the load transfer between the load-carrying platform and the ground-engaging platform is effected by only some of said rollers when the loading on the load-carrying platform is relatively low, but by an increasing number of said rollers, as a result of said flexing as the loading increases, to provide progressive load support.

16. A turntable for a heavy object, said turntable including:
a ground-engaging member;
a load-supporting platform, said ground-engaging member and said load-supporting platform each having load surfaces facing each other; and
an intermediate load transfer means comprising a cage rotatably mounted for rotation relative to both said ground-engaging member and said load-supporting platform (10) about a generally vertical axis, said intermediate load transfer means supporting the load-supporting platform off the ground-engaging member,
wherein the cage holds a plurality of rotatable rollers which are distributed across an extended region of said load surfaces and which are each constrained to rotate about a respective rolling axis which extends generally radially with respect to said generally vertical axis to allow rotation of said load-supporting platform with respect to said ground-engaging member about said generally vertical axis, and said ground-engaging member and said load-supporting platform are each constructed from sheet material which is configured for resilient flexing movement in use, whereby the assembly comprising said ground-engaging member, said cage and said load-supporting platform is able to flex in use, and
wherein the cage includes a plurality of radially extending spokes, each of said spokes supporting a plurality of said rollers.

17. A turntable for a heavy object, said turntable including:
a ground-engaging member and
a load-supporting platform each having load surfaces facing each other, the load-supporting platform is supported off the ground-engaging member by an intermediate load transfer cage rotatably mounted for rotation relative to both said ground-engaging member and said load-supporting platform about a generally vertical axis,
wherein the cage holds a plurality of rotatable rollers which are distributed across an extended region of said load surfaces and which are each constrained to rotate about a respective rolling axis which extends generally radially with respect to said generally vertical axis to allow rotation of said load-supporting platform with respect to said ground-engaging member about said generally vertical axis, and said ground-engaging member and said load-supporting platform are each resiliently flexible over at least the extended region, whereby the assembly comprising said ground-engaging member said cage and said load-supporting platform is able to flex in use, and
wherein said rollers are of at least three different diameters, whereby in use with a load, the load transfer between the load-carrying platform and the ground-engaging platform is effected by only some of said rollers when the loading on the load carrying platform is relatively low, but by an increasing number of said rollers, as a result of said flexing, as the loading increases, to provide progressive load support.

18. The turn table for a heavy object according to claim 16, wherein said ground-engaging member and said load-supporting platform are each formed from a plurality of sheet members attached together to flex as one.

19. The turn table for a heavy object according to claim 16, wherein said ground-engaging member and said load-supporting platform are each formed from a single sheet member so that each flex as one.

20. A turntable for a heavy object, said turntable including:
a ground-engaging member;
a load-supporting platform, said ground-engaging member and said load-supporting platform each having load surfaces facing each other; and
an intermediate load transfer means comprising a cage rotatably mounted for rotation relative to both said ground-engaging member and said load-supporting platform about a generally vertical axis, the load-supporting platform is supported off the ground-engaging member by said intermediate load transfer means,
wherein the cage holds a plurality of rotatable rollers which are distributed across an extended region of said load surfaces and which are each constrained to rotate about a respective rolling axis which extends generally radially with respect to said generally vertical axis to allow rotation of said load-supporting platform with respect to said ground-engaging member about said generally vertical axis, and
said ground-engaging member and said load-supporting platform are each formed from only a single sheet member or only a plurality of sheet members attached together, to flex as one and are each configured to flex in use over at least the extended region, whereby the assembly comprising said ground-engaging member said cage means and said load-supporting platform is able to flex in use.

* * * * *